US012619676B2

(12) United States Patent
Wallner et al.

(10) Patent No.: US 12,619,676 B2
(45) Date of Patent: May 5, 2026

(54) BINARY OPTIMIZATION WITH BOSON SAMPLING

(71) Applicant: ORCA Computing Limited, London (GB)

(72) Inventors: Hugo Wallner, London (GB); Kamil Bradler, Toronto (CA)

(73) Assignee: ORCA Computing Limited, London (GB)

( * ) Notice: Subject to any disclaimer, the term of this patent is extended or adjusted under 35 U.S.C. 154(b) by 1114 days.

(21) Appl. No.: 17/583,054

(22) Filed: Jan. 24, 2022

(65) Prior Publication Data

US 2023/0140189 A1 May 4, 2023

(30) Foreign Application Priority Data

Oct. 28, 2021 (GB) ...................................... 2115490

(51) Int. Cl.
*G06F 17/11* (2006.01)
*G06N 10/60* (2022.01)
(52) U.S. Cl.
CPC ............. *G06F 17/11* (2013.01); *G06N 10/60* (2022.01)
(58) Field of Classification Search
CPC ........ G06F 17/11; G06N 10/20; G06N 10/40; G06N 10/60
See application file for complete search history.

(56) References Cited

U.S. PATENT DOCUMENTS

2022/0172092 A1* 6/2022 Roman ................... G06N 20/00

FOREIGN PATENT DOCUMENTS

WO WO 2022/058757 A1 3/2022

OTHER PUBLICATIONS

Brod et al., "Photonic implementation of boson sampling: a review", in Advanced Photonics, vol. 1, Issue 3, 034001 (May 2019). https://doi.org/10.1117/1.AP.1.3.034001 (Year: 2019).*
Banchi et al., "Training Gaussian boson sampling distributions", in Physical Review A 102, 012417 (2020), DOI: 10.1103/PhysRevA. 102.012417 (Year: 2020).*
Olson et al., "Sampling arbitrary photon-added or photon-subtracted squeezed states is in the same complexity class as boson sampling", arXiv:1406.7821v3 (Year: 2015).*

(Continued)

*Primary Examiner* — Carlo Waje
(74) *Attorney, Agent, or Firm* — Fenwick & West LLP

(57) ABSTRACT

A system may include a boson sampler configured to generate an output bosonic state by performing a parametrized unitary transformation on an input bosonic state. The system may include a controller coupled to the boson sampler. The controller may be configured to: (i) determine a set of one or more parameter values that defines the parametrized unitary transformation performed by the boson sampler, (ii) operate the boson sampler multiple times with the boson sampler tuned to the determined set of parameter values, (iii) record one or more responses of the boson sampler for the multiple operations (iv) generate binary sequences based on the responses, (v) calculate values of an objective function of a binary optimization problem, and (vi) determine a solution to the binary optimization problem based on the calculated values.

18 Claims, 12 Drawing Sheets

(56) References Cited

OTHER PUBLICATIONS

Zhong et al., "Experimental Gaussian Boson sampling", Science Bulletin vol. 64, Issue 8, Apr. 30, 2019, pp. 511-515, https://doi.org/10.1016/j.scib.2019.04.007 (Year: 2019).*

Tillman et al., "Experimental boson sampling", arXiv:1212.2240v1 (Year: 2012).*

Arrazola et al., "Quantum approximate optimization with Gaussian boson sampling", Physical Review A 98, 012322 (2018), DOI: 10.1103/PhysRevA.98.012322 (Year: 2018).*

Aaronson, S. et al., "The Computational Complexity of Linear Optics," arXiv:1011.3245, Nov. 14, 2010, pp. 1-94.

Bradler, K. et al., "Certain properties and applications of shallow bosonic circuits," arXiv:2112.09766, Dec. 17, 2021, pp. 1-34.

Gard, B.T. et al., "An introduction to boson-sampling," arXiv:1406.6767, Jun. 26, 2014, pp. 1-13.

Reck, M. et al., "Experimental realization of any discrete unitary operator," Physical Review Letters, vol. 73, Jul. 1994, pp. 58-61.

* cited by examiner

BINARY OPTIMIZATION WITH BOSON SAMPLING

CROSS-REFERENCE TO RELATED APPLICATION

This application claims priority to United Kingdom Application No. GB2115490.1, "Binary Optimization with Boson Sampling," filed on Oct. 28, 2021, which is hereby incorporated by reference in its entirety.

TECHNICAL FIELD

The present disclosure relates to methods and systems for addressing binary optimization problems. More particularly, the present disclosure relates to methods and systems that utilize one or more boson sampling devices to determine solutions to binary optimization problems.

BACKGROUND

Binary optimization problems are a subclass of combinatorial optimization problems in which the variables are restricted to one of two values. A binary optimization problem can generally be stated as a problem of minimizing (or maximizing) an objective function of variables that can take one of two values, for example 0 or 1.

One famous binary optimization problem is the Quadratic Unconstrained Binary Optimization (QUBO) problem, which is also referred to as the Unconstrained Binary Quadratic Programming (UBQP) problem. The task is to find a binary sequence b of length L that minimises the objective function $b^T Q b$ where Q is an L×L symmetric matrix having real values. Many problems of real-world relevance can be cast into a QUBO form: for example, the travelling salesman problem in which one is given a list of destinations and distances therebetween and must devise the shortest route that visits each destination exactly once and returns to the starting point, may be cast as a QUBO problem. QUBO is an NP hard problem and so is intractable on a classical computer when the number L of binary variables is large.

Techniques for solving binary optimization problems are desirable.

SUMMARY

Some embodiments relate to a system for determining a solution to a binary optimization problem. The system comprises a boson sampler and a controller. The boson sampler comprises a state generation module for generating an input multimodal bosonic state comprising a plurality of input modes. The boson sampler further comprises a linear bosonic circuit for performing a parametrised unitary transformation of the input multimodal bosonic state to an output multimodal bosonic state comprising a plurality of output modes. The boson sampler further comprises a state detection module for performing measurements on output modes of the output multimodal bosonic state to produce measurement outcomes, wherein each measurement outcome is based on the number of bosons in measured output modes of the output multimodal bosonic state. The controller is operable to (i) initialise a set of parameter values, the set of parameter values for defining the parametrised unitary transformation of the boson sampler. The controller is further operable to (ii) for at least one selected parameter, use the boson sampler to determine a gradient of a cost function with respect to that selected parameter. The controller is further operable to (iii) using the at least one determined gradient, update the set of parameter values. The controller is further operable to (iv) repeat (ii) and (iii) until a convergence criterion is satisfied. The controller is further operable to (v) after the convergence criterion is satisfied, cause the boson sampler to be operated with the converged set of parameter values. The controller is further configured to (vi) receive a response from the boson sampler, the response representative of an empirical probability distribution of measurement outcomes. The controller is further operable to (vii) map each distinct measurement outcome to a binary sequence of a plurality of binary sequences, wherein each element of a binary sequence corresponds to a measured output mode of the output multimodal bosonic state and has a value based on a parity of the number of bosons in that corresponding measured output mode. The controller is further operable to (viii) for at least two binary sequences to which a measurement outcome is mapped, evaluate an objective function using the binary sequence to determine a corresponding function value, the objective function characteristic of the binary optimization problem. The controller is further operable to (ix) identify, based on a comparison of the function values, a binary sequence as a solution to the binary optimization problem.

Advantageously, the system described herein exploits both a classical computing resource and a quantum computing resource in the form of a boson sampler, to determine a solution to a binary optimization problem. By exploiting bosonic statistics and mapping measurement outcomes to binary sequences based on a parity of the number of bosons in an output mode, the system is able to handle even large binary optimization problems (those for which the candidate solutions have a large number of elements).

Furthermore, by mapping measurement outcomes to binary sequences based on a parity of the number of bosons in an output mode, the boson sampler may be a shallow (i.e., not full-depth) boson sampler. If the input multimodal bosonic state and the output multimodal bosonic state each comprise M modes, then the set of parameter values for defining the parametrised unitary transformation of the boson sampler may comprise as few as M−1 parameter values. As a shallow boson sampler may be utilised, the number of components and therefore the amount of error in the computation can be greatly reduced.

The state detection module may comprise one or more boson number resolving detectors. Each measurement outcome may correspond to a measurement of the number of bosons in measured output modes of the output multimodal bosonic state.

Each measurement outcome may correspond to a measurement of the parity of the number of bosons in each measured output mode of the output multimodal bosonic state.

The plurality of input modes may comprise a plurality of spatial modes.

The plurality of input modes may comprise a plurality of temporal modes. The linear bosonic circuit may comprise a time bin interferometer.

In some examples, the state generation module may be configured to generate an input multimodal bosonic state comprising M input modes, each input mode comprising a boson. Each binary sequence of the plurality of binary sequences may have a number L of elements that is fewer than the number of output modes M of the output multimodal bosonic state. The state detection module may be configured to perform measurements on L of the M output modes of the output multimodal bosonic state, each measurement outcome based on the number of bosons in the measured L output modes of the output multimodal bosonic state. Mapping each measurement outcome to a binary sequence may include discarding at least one element of the measurement outcome. Advantageously, if L<M, then the controller need only perform (i) to (ix) once to determine a solution.

In some examples, the state generation module may be configured to generate an input multimodal bosonic state comprising M input modes, each input mode comprising a boson. The system may further comprise a second boson sampler including a state generation module for generating an input multimodal bosonic state comprising M input modes, with M−1 input modes comprising a boson. The controller may be further operable to perform (i) to (viii) using the second boson sampler. By taking advantage of parallel processing in this way, the system may advantageously determine a solution of length L=M efficiently.

In some examples, the state generation module may be configured to generate a first input multimodal bosonic state comprising M input modes, each input mode comprising a boson. The state generation module may be further configured to generate a second input multimodal bosonic state comprising M input modes, with M−1 input modes comprising a boson. The controller may be operable to perform (ii) and (v) with the state generation module configured to generate one of the first or second input multimodal bosonic state. The controller may be further operable to repeat (i) to (viii), wherein (ii) and (v) are performed with the state generation module configured to generate the other of the first or second input multimodal bosonic state. The controller may be further operable to control the state generation module to select which of the first or second input multimodal bosonic states is generated.

In some examples, mapping each measurement outcome to a binary sequence may comprise mapping each measurement outcome to a binary sequence according to a first mapping under which each element of a binary sequence has a first value if the number of bosons in the corresponding output mode is odd and a second binary value if the number of bosons in the corresponding output mode is even. The controller may be further operable to repeat (i) to (viii), wherein mapping each measurement outcome to a binary sequence comprises mapping each measurement outcome to a binary sequence according to a second mapping under which each element of a binary sequence has the first binary value if the number of bosons in the corresponding output mode is even and the second binary value if the number of bosons in the corresponding output mode is odd.

In some examples, using the boson sampler to determine a gradient of the cost function with respect to a selected parameter may comprise a) identifying first and second adjusted sets of parameter values, wherein the first adjusted set comprises the set of parameter values with the parameter value of that selected parameter adjusted positively by an amount, and wherein the second adjusted set comprises the set of parameter values with the parameter value of that selected parameter adjusted negatively by the same amount. Using the boson sampler to determine a gradient of the cost function with respect to a selected parameter may comprise b) for each of the first and second adjusted sets: causing the boson sampler to be operated with the adjusted set of parameter values; receiving a response from the boson sampler, the response representative of an empirical probability distribution of measurement outcomes; mapping each distinct measurement outcome to a binary sequence of a plurality of binary sequences, wherein each element of a binary sequence corresponds to a measured output mode of the output multimodal bosonic state and has a value based on a parity of the number of bosons in that corresponding output mode; determining, from the empirical probability distribution of measurement outcomes, a weighting for each binary sequence to which a measurement outcome is mapped; evaluating the cost function for the adjusted set using the plurality of binary sequences and the weightings of the binary sequences to obtain an adjusted function value. Using the boson sampler to determine a gradient of the cost function with respect to a selected parameter may comprise c) determining, from the adjusted function values for the first and second adjusted sets, a gradient of the cost function with respect to that selected parameter. The system may comprise a photonic boson sampler.

The state generation module may comprise one or more single photon sources.

The linear bosonic circuit may comprise one or more reconfigurable beam splitters for coupling modes with a reconfigurable reflection coefficient and, optionally, with a reconfigurable phase shift coefficient. For example, one or more reconfigurable beam splitters may comprise a Mach-Zehnder interferometer. For example, a Mach-Zehnder interferometer may comprise two 50:50 beam splitters with a reconfigurable thermo-optic phase shifter on one internal path between the two 50:50 beam splitters. Optionally, a further phase shifter may be arranged on an external path (input or output) of a Mach-Zehnder interferometer.

The linear bosonic circuit may be comprised in an integrated photonic circuit. That is, an integrated photonic circuit may comprise a linear interferometer having a plurality reconfigurable beam splitters. The integrated photonic circuit may further comprise one or more photon sources. The integrated photonic circuit may further comprise one or more detectors.

The binary optimization problem may comprise a quadratic unconstrained binary optimization, QUBO, problem. For example, the QUBO problem may comprise a travelling salesman type problem. The binary optimization problem may comprise a portfolio optimization problem.

Some embodiments relate to a method for determining a solution to a binary optimization problem using a boson sampler. The method is suitable for performance by one or more classical processors in communication with a boson sampler. The boson sampler is operable to prepare an input multimodal bosonic state, perform a parametrised unitary transformation of the input multimodal bosonic state to an output multimodal bosonic state comprising a plurality of output modes, and perform measurements on output modes to produce measurement outcomes, wherein each measurement outcome is based on the number of bosons in measured output modes of the output multimodal bosonic state. The method comprises (i) initialising a set of parameter values, the set of parameter values for defining the parametrised unitary transformation of the boson sampler. The method further comprises (ii) for at least one selected parameter, using the boson sampler to determine a gradient of a cost function with respect to that selected parameter. The method further comprises (iii) using the at least one determined gradient, updating the set of parameter values. The method further comprises (iv) repeating (ii) and (iii) until a convergence criterion is satisfied. The method further comprises (v) after the convergence criterion is satisfied, causing the boson sampler to be operated with the converged set of parameter values. The method further comprises (vi) receiving a response from the boson sampler, the response representative of an empirical distribution of measurement outcomes. The method further comprises (vii) mapping each distinct measurement outcome to a binary sequence of a plurality of binary sequences, wherein each element of a binary sequence corresponds to a measured output mode of the output multimodal bosonic state and has a value based on a parity of the number of bosons in that corresponding output mode. The method further comprises (viii) for each of at least two binary sequences to which a measurement outcome is mapped, evaluating an objective function using the binary sequence to determine a corresponding function value, the objective function characteristic of the binary optimization problem. The method further comprises (ix) identifying, based on a comparison of the function values, a binary sequence as a solution to the binary optimization problem.

Some embodiments relate to a computer-readable medium. The computer-readable medium has instructions stored thereon that, when executed by one or more processors in communication with a boson sampler, cause a method for determining a solution to a binary optimization problem to be executed.

A computer program and/or the code/instructions for performing such methods as described herein may be provided to an apparatus, such as a computer, on a computer-readable medium or computer program product. The computer-readable medium may comprise a non-transitory computer-readable medium. The computer-readable medium could be, for example, an electronic, magnetic, optical, infrared, electromagnetic, or semiconductor system, or a propagation medium for data transmission, for example for downloading the code over the Internet. Alternatively, the computer-readable medium could take the form of a physical computer-readable medium such as a semiconductor or solid-state memory, magnetic tape, a removable computer diskette, a random access memory (RAM) a read-only memory (ROM), a rigid magnetic disc, and an optical disk, such as a CD-ROM, CD-RW or DVD.

Some embodiments relate to a computing apparatus/computing device for determining a solution to a binary optimization problem. The computing apparatus comprises one or more processors. The computing apparatus comprises one or more computer-readable storage media having stored thereon instructions. When executed by the one or more processors while the computing apparatus is in communication with a boson sampler, the computing apparatus is caused to (i) initialise a set of parameter values, the set of parameter values for defining the parametrised unitary transformation of the boson sampler; (ii) for at least one selected parameter, use the boson sampler to determine a gradient of a cost function with respect to that selected parameter; (iii) using the at least one determined gradient, update the set of parameter values; (iv) repeat (ii) and (iii) until a convergence criterion is satisfied; (v) after the convergence criterion is satisfied, cause the boson sampler to be operated with the converged set of parameter values; (vi) receive a response from the boson sampler, the response representative of an empirical distribution of measurement outcomes; (vii) map each distinct measurement outcome to a binary sequence of a plurality of binary sequences, wherein each element of a binary sequence corresponds to a measured output mode of the output multimodal bosonic state and has a value based on a parity of the number of bosons in that corresponding measured output mode; (viii) for each of at least two binary sequences to which a measurement outcome is mapped, evaluate an objective function using the binary sequence to determine a corresponding function value, the objective function characteristic of the binary optimization problem;

and (ix) identify, based on a comparison of the function values, a binary sequence as a solution to the binary optimization problem.

Many modifications and other embodiments set out herein will come to mind to a person skilled in the art to which these embodiments pertain in light of the teachings presented herein. Therefore, it will be understood that the disclosure herein is not to be limited to the specific embodiments disclosed herein. Moreover, although the description provided herein provides example embodiments in the context of certain combinations of elements, steps and/or functions may be provided by alternative embodiments without departing from the scope of the invention.

BRIEF DESCRIPTION OF THE DRAWINGS

Embodiments will now be described by way of example only, with reference to the accompanying figures, in which.

Throughout the description and the drawings, like reference numerals refer to like parts.

DETAILED DESCRIPTION

Figure 1:
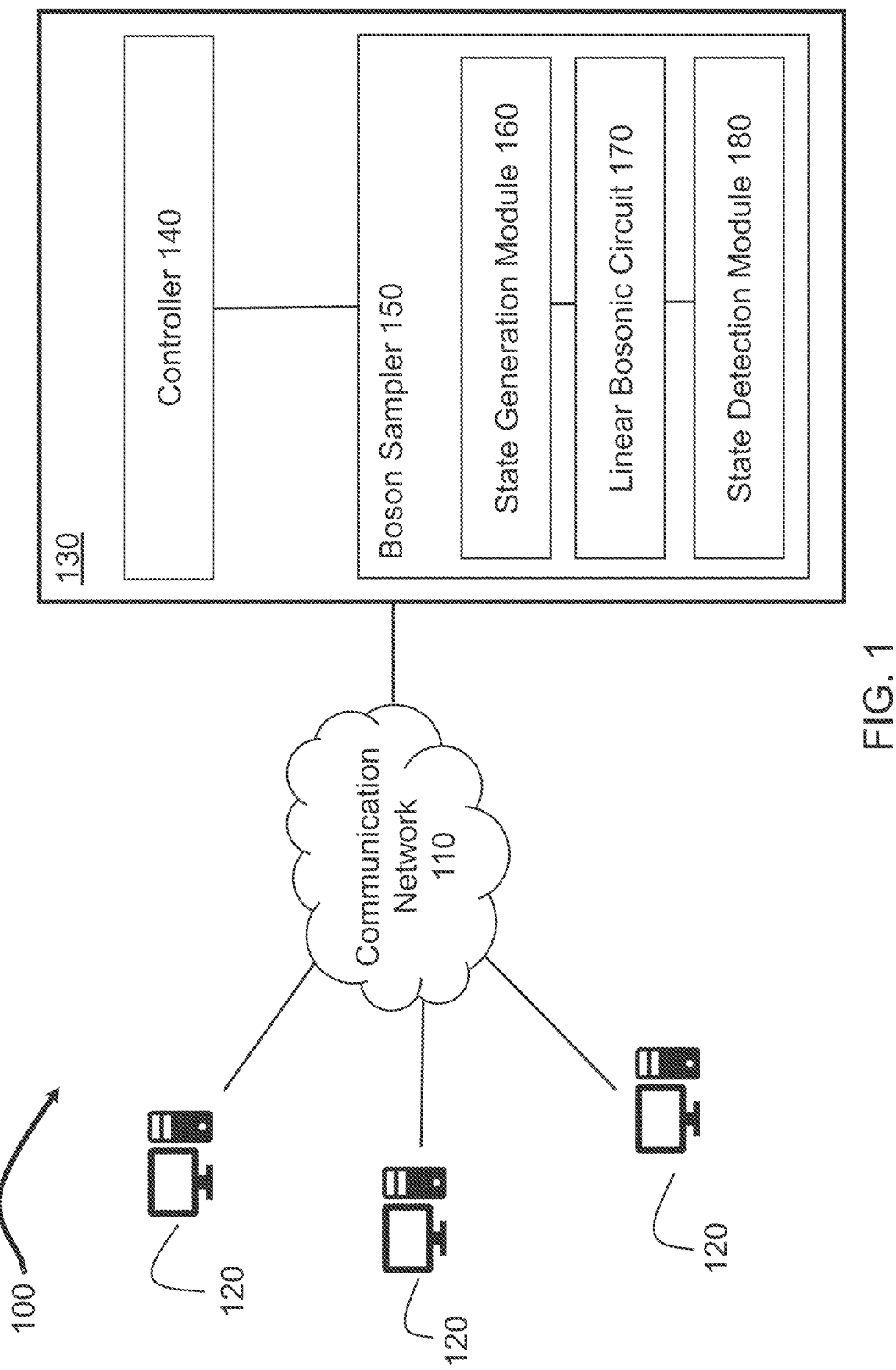
FIG. 1 shows a computing network including a binary optimization system.

Whilst various embodiments are described below, the invention is not limited to these embodiments, and variations of these embodiments may well fall within the scope of the invention which is to be limited only by the claims.

A binary sequence is understood to mean any ordered sequence of elements that can take one of two values. In some examples, elements of a binary sequence may take a value of 0 or 1. In other examples, elements of a binary sequence may take a value of −1 or 1.

The term "unitary transformation" as used herein is understood to mean substantially unitary. For example, loss or other errors may mean that a transformation imparted by a boson sampler is not an exact unitary transformation, but the skilled person will appreciate that the methods and systems described herein are also applicable in such circumstances.

Many binary optimization problems are NP hard and so cannot be reliably solved on a classical computer alone. As the number L of variables increases, the number of candidate solutions increases exponentially as $2^L$.

Quantum computers/quantum information processors promise to provide solutions to many problems that are intractable on classical computers. To date, many different physical implementations and models for quantum computing have been proposed. Physical implementations proposed for quantum computing include nuclear magnetic resonance, ion traps, superconductors, quantum dots, electrons on liquid helium, solid state spectroscopy, and photonic quantum computing to name but a few. While quantum computing has advanced to the point at which "quantum supremacy" has been achieved, the technology is still in its infancy and a practical universal quantum computer—a quantum computer capable of efficiently simulating any other quantum computer—is not expected to be implemented in the near term.

In part to address the lack of any powerful universal quantum computing resources, several quantum-classical hybrid algorithms have been proposed. In a quantum-classical hybrid algorithm, both classical and quantum resources are used to perform a computational task. Variational Quantum Eigensolvers (VQEs) are one such category of hybrid quantum-classical algorithms designed to compute ground state energies of quantum Hamiltonians, and have been used to find, for example, ground state energies of interacting fermionic Hamiltonians. However, VQEs still typically require quantum resources that are beyond those available currently or in the short-to-medium term. In particular, VQEs often require quantum computing resources that are able to perform a universal set of quantum logic operations on qubits.

Described herein are methods and systems that utilise boson sampling as part of a quantum-classical hybrid algorithm to address binary optimization problems. A boson sampler is a non-universal quantum computer that is significantly more straightforward to build than any universal quantum computer proposed so far. In boson sampling, one generates an input bosonic state (for example a photonic state comprising a plurality of photons), applies a transformation to that input bosonic state (for example, by sending the photons through a linear interferometer), and samples from the output distribution. A boson sampler/boson sampling device is operable to prepare an input multimodal bosonic state, to perform a transformation of the input bosonic state to an output multimodal bosonic state, and to perform measurements on output modes of the output multimodal bosonic state. The measurements performed are typically based on the number of bosons in each output mode. For a given input state, one can with repeated operations of the boson sampler build up an empirical probability distribution of bosonic configurations of the output state. For an introduction to boson samplers, the reader is directed to B. Gard et al. "An Introduction to Boson Sampling", Quantum Physics ArXiv 1406.6767, and to S. Aaronson and A. Arkhipov, "The computational complexity of linear optics", Proceedings of the forty-third annual ACM symposium on theory of computing, pages 333-342, ACM, 2011.

To understand boson sampling, one may find it useful to think of a classical Galton board. When using a traditional Galton board, a plurality of substantially identical balls are dropped from an entrance hole one by one onto a vertical lattice of pegs, each of which randomly scatters the incoming balls onto pegs below, and the balls are collected in receptacles at the bottom of the board. Traditionally, the arrangement of the pegs on the Galton board ensures that with enough balls, the distribution of balls in each receptacle approaches the binomial distribution. If one reconfigures the arrangement of pegs, one can see a different distribution of the balls in the receptacles. If one adapts the Galton board to provide further entrance holes, then multiple balls may be dropped from an appropriate choice of the entrance holes to provide a selected input configuration. The input configuration of balls will then fall through the peg arrangement to the receptacles.

Somewhat analogously, in a boson sampler, bosons may be initially arranged in some input configuration in which each boson occupies one of several input modes (analogous to multiple entrance holes on the adapted Galton board, except that in the adapted Galton board only a single ball can be dropped from any particular entrance hole at a time, while an input mode of a boson sampler may take more than one boson). The input modes may comprise, for example, spatial modes such as input ports to an interferometer (analogous to the spatial arrangement of the multiple entrance holes of the adapted Galton board), or may comprise other modes, for example temporal modes, that describe some other quantum degree of freedom of the bosonic system.

The input multimodal bosonic state generated for the boson sampler is typically a product state (i.e., no quantum entanglement between input modes) comprising N bosons distributed across M input modes. For illustrative purposes only, the present discussion is restricted to the case where the number of bosons N is less than or equal to the number of input modes M, and where one boson is provided in any input mode. The skilled person will appreciate that the methods and systems described herein are also applicable when one or more input modes comprise more than one boson. Accordingly, in the present discussion the input state can without loss of generality be expressed as $$|\Psi_N\rangle = |1_1, 1_2, \ldots, 1_N, 0_{N+1}, \ldots, 0_M\rangle = \hat{a}_1^\dagger \ldots \hat{a}_N^\dagger |0_1, \ldots, 0_M\rangle \quad \text{(EQ. 1)}$$

where $$\hat{a}_k^\dagger$$

is the bosonic creation operator in the $k^{th}$ mode.

In contrast to the balls of the Galton board, bosons are quantum objects and are governed by bosonic statistics. This is starkly exemplified by the famous Hong-Ou-Mandel effect: if two single photons are incident on a 50/50 beam splitter at the same time, one in each of two input modes (input paths) of the beam splitter, then due to interference the output modes (output paths) taken by the photons become entangled. The output state can be expressed as a superposition of two configurations—one in which both photons are deflected to a first output mode and one in which both photons are deflected to the second output mode. Due to interference, other conceivable possibilities such as each output path carrying a single photon are cancelled out. The probability of the two photons being found in a particular one of the output modes is 50%.

A boson sampler applies some transformation to the input multimodal bosonic state to produce an output multimodal bosonic state. This transformation may also be referred to as a linear bosonic circuit. A linear bosonic circuit may be modelled as a unitary transformation, although loss and other factors may mean that the transformation is not exactly unitary i.e., the linear bosonic circuit may be is a substantially unitary transformation. For example, photons passing through a beam splitter may be lost due to some kind of absorption at the beam splitter or scattering due to some mode not measured by the device. In this example, photon loss may mean that the number of photons in the input state and output state is not conserved, which means that the transformation is not exactly unitary. Thus, the term "unitary transformation" as used herein may include a transformation that is substantially unitary. Furthermore, a skilled person will appreciate that the methods and systems described herein are still applicable in circumstances where the transformation is not exactly unitary. The unitary transformation acts on the creation operators as $$\hat{U}(\theta)\hat{a}_i^\dagger\hat{U}(\theta) = \sum_{j=1}^{M} U_{i,j}(\theta)\hat{a}_i^\dagger \qquad \text{(EQ. 2)}$$

where $\hat{U}(\theta)$ is a unitary matrix. The linear bosonic circuit is defined by a set of parameters $\theta$. One or more of the parameters $\theta$ may characterise a single mode operation. For example, a parameter may characterise the phase shift imparted by a phase shifter of a passive linear photonic network. One or more of the parameters $\theta$ may characterise a multimodal operation. For example, a parameter may characterise a transmittance of a reconfigurable beam splitter in a passive linear photonic network. If the values $\{\theta\}$ of one or more of the parameters $\theta$ may be reconfigured then the boson sampler is said to be a reconfigurable boson sampler.

Boson sampling is well-defined for any bosonic particles, and the way in which the linear bosonic circuit is implemented depends on the boson sampling system of interest. The linear bosonic circuit may be a physical part or module of the boson sampler. For example, in photonics, the linear bosonic circuit may comprise a passive linear photonic network/passive linear interferometer comprising reconfigurable beam splitters, phase shifters and other passive linear optical elements suitable for transforming an input multimodal photonic state to an output multimodal photonic state. In other examples, the linear bosonic circuit may not be a physical module of the boson sampler and may be implemented instead as an ordered sequence of controlled operations applied to the bosons of the system of interest. In what follows, the linear bosonic circuit will often be described as though it is a physical part of the boson sampler, but the skilled person would appreciate that in other implementations this need not be the case.

The unitary mapping transforms the input state into an output state that may be expressed as a superposition of the different possible configurations of the bosons in the output modes as $$|\Psi_{OUT}(\theta)\rangle = \sum_C \alpha_C|n_1^{(C)}, n_2^{(C)}, \dots, n_M^{(C)}\rangle \qquad \text{(EQ. 3)}$$

where C is a configuration, $$n_j^{(c)}$$

is the number of bosons in the $j^{th}$ output mode in configuration C, and $\alpha_C$ is the probability amplitude associated with configuration C. By tuning the parameter values $\{\theta\}$, the probability amplitudes associated with each configuration may be changed. A measurement, using one or more boson number resolving detectors, of the number of bosons in each output mode yields a measurement outcome representable as a string of integers corresponding to a configuration C. By operating the boson sampler a plurality $N_S$ of times, it is possible to establish an empirical probability distribution of the bosonic configurations of the output state. One can expect that with a large number of samples, the probability of obtaining a measurement outcome corresponding to configuration C is approximately given by $$p_C = |\alpha_C|^2.$$

The use of a boson sampler to address binary optimization problems may seem counter-intuitive because measurement outcomes from boson samplers normally describe the number of bosons in each output mode of a boson sampler, which may not be a binary value. Bosons are not qubits and so one cannot encode an arbitrary qubit Hamiltonian like in other variational quantum-classical hybrid algorithms. Furthermore, the mechanism behind creating entangled states in linear bosonic circuits is quite different from the mechanism behind creating entangled states in qubit circuits because entanglement between modes in a linear bosonic circuit is very much related to boson statistics. The output multimodal bosonic state produced in a boson sampler is not typically considered a multiqubit state. The same holds for the Fock measurement (a measurement of the number of bosons in a mode)—it is quite dissimilar from a measurement in the qubit basis. Furthermore, boson sampling does not involve active error correction on the quantum device.

Figure 8:
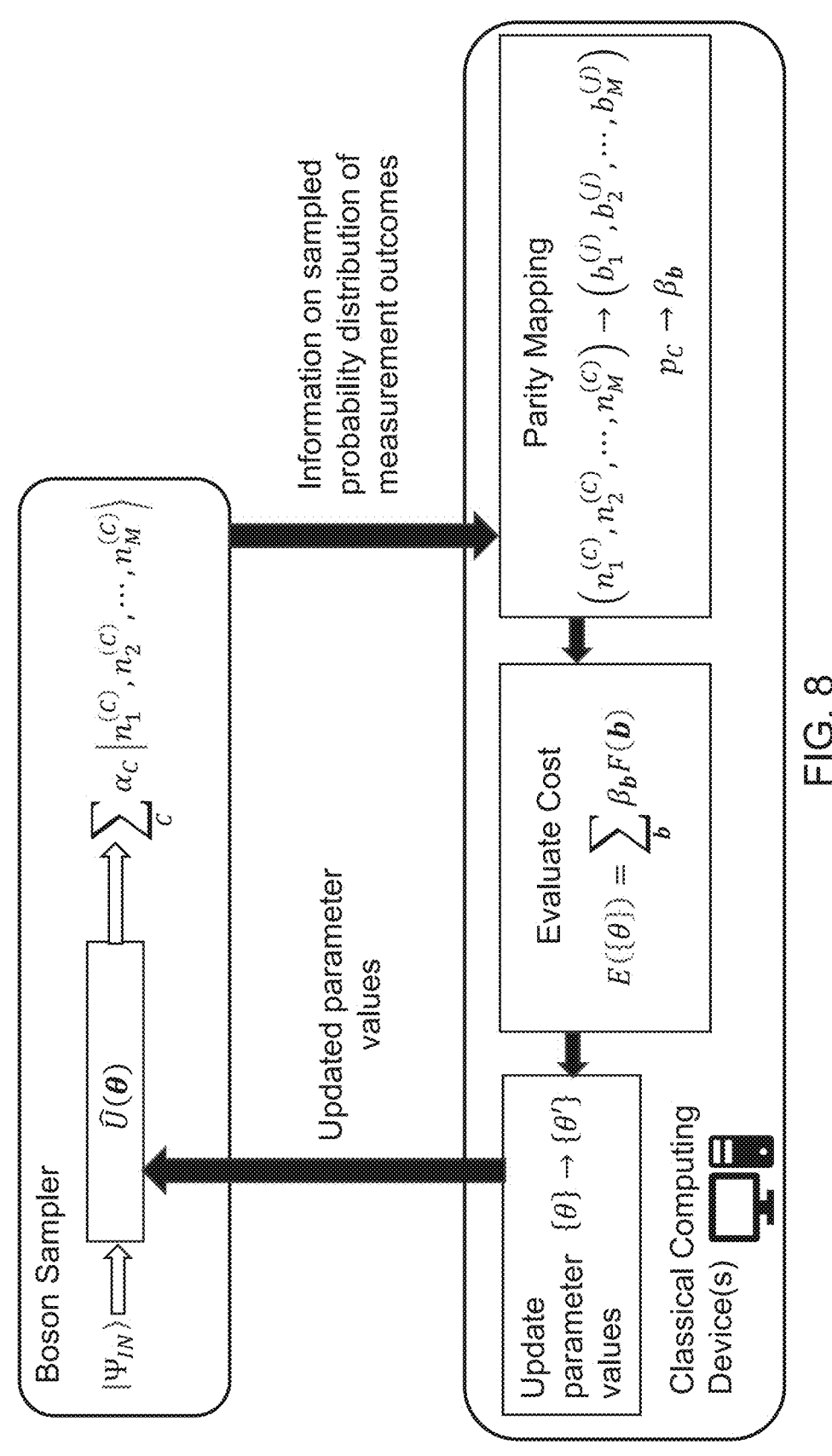
FIG. 8 shows an illustration of a quantum-classical hybrid algorithm for determining a solution to a binary optimization problem.

A quantum-classical hybrid process for identifying a binary sequence will now be described at a high level. An illustration of the process is provided in FIG. 8. The binary optimization task is to identify a binary sequence b of length L that optimizes an objective function F(b). The length of the binary sequence/number of binary variables L is less than or equal to the number M of input modes of an input multimodal bosonic state generated in a boson sampler. Measurement outcomes are produced by performing measurements on each of at least L of the M output modes of the output multimodal bosonic state. By doing this, the parity of the number of bosons in each output mode of a bosonic state can be used to efficiently map measurement outcomes from the boson sampler to binary sequences. In particular, by using the parity of the number of bosons in each mode, the full range of binary sequences of length L can be accessed even with shallow bosonic circuits, which means that fewer components can be used within the boson sampler, which in turn means that losses and therefore computational errors are greatly reduced.

Consider, as an example, that a binary sequence of length L=M is sought and that a measurement outcome from a boson sampler indicates the number of bosons in each of the M output modes. For example, the boson sampler may be a photonic boson sampler and the boson sampler may comprise one or more photon number resolving detectors capable of measuring the number of bosons in each output mode. Each measurement outcome in such circumstances may comprise a string of integers, each integer indicating the number of bosons found in a corresponding output mode. If one samples from the boson sampler $N_S$ times, then one may construct an empirical probability distribution of at most $N_S$ integer strings (measurement outcomes). That is, one may determine from the plurality of measurement outcomes that the empirical probability of measuring the output state (EQ. 3) in a specific configuration C with boson distribution $$\left(n_1^{(C)}, n_2^{(C)}, \ldots, n_M^{(C)}\right)$$

is $p_C$. One can expect that as the number of measurements taken, $N_S$, grows large, the probability $p_C$ of obtaining a particular integer string tends towards the square of the absolute value of the probability amplitude of the corresponding bosonic configuration $|\alpha_C|^2$.

Measurement outcomes are then mappable to binary sequences of length L=M by evaluating the parity of each integer of an integer string. There are two approaches to this. According to one approach, if the integer is even, then the corresponding character of the binary sequence has a first value, while if the integer is odd, then the corresponding character of the binary sequence has a second value. According to the alternative approach, if the integer is odd, then the corresponding character of the binary sequence has the second value, while if the integer is even then the corresponding character of the binary sequence has the first value. Taking the first value and the second value to be 0 and 1 respectively, these two parity mappings can be described by:

$$\rho_0: b_k^{(0)} = \mathrm{mod}\left[n_k^{(C)}, 2\right] \qquad \text{(EQ. 4)}$$

$$\rho_1: b_k^{(1)} = \mathrm{mod}\left[n_k^{(C)}, 2\right] \oplus 1 \qquad \text{(EQ. 5)}$$

where $\oplus$ denotes binary addition.

According to the mapping of (EQ. 4), if the number of bosons in a particular output mode is even, then the corresponding binary digit is a 0, while if the number of bosons in that particular output mode is odd, then the corresponding binary digit is 1. According to the mapping of (EQ. 5), if the number of bosons in a particular output mode is even, then the corresponding binary digit is a 1, while if the number of bosons in that particular output mode is odd, then the corresponding binary digit is 0. Using either mapping, each measurement outcome $$\left(n_1^{(C)}, n_2^{(C)}, \ldots, n_M^{(C)}\right)$$

is mapped to a binary sequence $$b = \left(b_1^{(j)}, b_2^{(j)}, \ldots, b_M^{(j)}\right)$$

of a plurality of binary sequences (j is 0 or 1) wherein each element of a binary sequence corresponds to a measured output mode of the output multimodal bosonic state and has a value based on a parity of the number of bosons in that corresponding measured output mode. Multiple measurement outcomes may be mapped to the same binary sequence. For example, the integer strings (3, 0, 1, 0) and (1, 2, 1, 0) will lead to the same binary sequence. Accordingly, each binary sequence b has a corresponding weighting/probability $\beta_b$ that corresponds to the sum of the empirical probabilities of all measurement outcomes that map to that binary sequence:

$$\beta_b = \sum_{\substack{C \text{ where} \\ \rho_j(C)=b}} p_C \qquad \text{(EQ. 6)}$$

If the size of a candidate binary sequence L is smaller than the number of input modes M, then one may optionally measure only L of the output modes of the bosonic state or, alternatively, one may perform measurements on all M output modes and discard one or more elements of the corresponding measurement outcome.

A cost function/penalty function, denoted $E(\{\theta\})$, is defined based on the binary sequences to which one or more measurement outcomes map and the corresponding weightings of those binary sequences:

$$E(\{\theta\}) = \sum_b \beta_b F(b) \qquad \text{(EQ. 7)}$$

where $\{\theta\}$ represent a set of parameter values defining the parametrised transformation of the boson sampler, b represents a binary sequence mapped from at least one of the measurement outcomes obtained from the boson sampler when configured with that set of parameter values, and $\beta_b$ represents the weighting given to that binary sequence based on the (empirically derived) probabilities of all measurement outcomes that map to that that binary sequence.

The mapping of measurement outcomes to binary sequences can be performed by the classical computing resource used for implementing the hybrid process. Similarly, the weightings $\beta_b$ of the binary sequences can also be computed using the classical resource. Furthermore, the cost function (EQ. 7) can also be evaluated using the classical resource.

In order to home in on an optimal binary sequence for the binary optimization problem, the cost function (EQ. 7) is reduced (e.g., minimized) (or increased (e.g., maximized) in some embodiments) with respect to the parameter values defining the linear bosonic circuit. Any suitable method may be used for this, for example gradient descent or stochastic gradient descent. Once a convergence criterion is met, the boson sampler is operated using the converged parameter values, the output multimodal state is sampled and the measurement outcomes are mapped to binary sequences.

Roughly speaking, by iteratively reconfiguring the boson sampler to minimise the cost function (EQ. 7), the number of candidate solutions to the binary optimization problem is reduced from $2^L$ to a number more manageably computable on a classical processor (e.g., the total number of objective function evaluations may be polynomial on L instead of exponential on L). Due to the probabilistic nature of quantum mechanics, even after convergence multiple binary sequences may have a high weighting and the binary sequence that reduced (e.g., minimizes) the objective function F(b) may or may not have the greatest weighting. Accordingly, a binary sequence is identified by evaluating the objective function for each of at least two binary sequences that are mapped from one or more measurement outcomes of the boson sampler operating with converged parameter values.

FIG. 1 depicts a computing network 100 in accordance with an illustrative example. The computing environment 100 comprises a communication network 110, one or more classical computing apparatuses 120, and a heterogeneous computing system 130. The computing network 100 shown in FIG. 1 is intended as an example only, as would be appreciated by the skilled person. For example, the computing network 100 may comprise more or fewer classical computing apparatuses 120.

The heterogeneous computing system 130 is configured to perform a quantum-classical hybrid algorithm in order to process a binary optimization task. In this example, the heterogeneous computing system 130 comprises a quantum computing resource in the form of a reconfigurable boson sampler/reconfigurable boson sampling device 150 and a classical computing resource in the form of a dedicated controller 140. The boson sampler 150 is configured to perform a boson sampling task (as will be described further below) and the controller is configured to perform classical subroutines of the quantum-classical hybrid algorithm (as will be described further below) and to control or coordinate the operation of the boson sampler 150. The skilled person will appreciate that other architectures for the heterogeneous computing system 130 are also suitable. For example, the heterogeneous computing system 130 may comprise a controller 140 and a plurality of boson samplers 150 thereby enabling parallel processing of a binary optimization task. In another example, the heterogeneous computing system 130 may comprise a plurality of boson samplers 150, each having a respective controller 140. Furthermore, while the controller 140 and boson sampler 150 are shown as co-located entities in FIG. 1, the skilled person would appreciate that this need not be the case—for example, the controller 140 and the boson sampler 150 may be spatially separated and communicate over a private or public communication network such as communication network 110.

The one or more classical computing apparatuses 120 and the heterogeneous computing system 130, or more particularly the controller 140 of the heterogeneous computing system 130, can communicate with each other over the communication network 110. The communication network 110 may be any known type of communication network enabling wired or wireless communication between computing apparatuses 120 and the controller 140, and could be for example a Local Area Network (LAN), a Wide Area Network (WAN), or the Internet.

A user of a computing apparatus 120 may submit a binary optimization task/problem to the heterogeneous computing system 130 over the communication network 110. The heterogeneous computing system 130 may then find a solution to the submitted binary optimization problem and return a solution to the computing apparatus 120. In particular, the controller 140 and boson sampler 150 may together execute a quantum-classical hybrid process to determine a solution to the binary optimization task by processing classical tasks on the controller 140 and quantum tasks on the boson sampler 150. A user may alternatively interact with the controller 140 in order to submit the binary optimization task. In some embodiments, a computing apparatus 120 includes the controller 140 and the controller 140 communicates with the boson sampler 150 via the communication network 110.

As used herein, "solution" may refer to a value that exactly minimizes (or maximizes) an objective function (e.g., a globally optimal solution). However, the term should not be limited to this definition. For example, a "solution" may refer to a value that reduces (or increases) an objective function relative to an initial value. In another example, a "solution" results in a local minimum or maximum of the objective function.

In some embodiments, the computing network 100 is a cloud computing system where boson computing is provided as a shared service to separate users. In a first example, a cloud computing service provider operates the boson sampler 150 and allows users to use the boson sampler 150. For example, a user using a computing apparatus 120, determines how to solve a binary optimization task/problem using a boson sampler, generates control instructions (e.g., parameter values) based on the determination, and transmits the control instructions to the computing system 130. In this example, the user's computing apparatus 120 may include the controller 140 or perform one or more of the controller 140 operations. In a second example, a cloud computing service provider receives a binary optimization task/problem from a user, determines how to solve the task/problem using a boson sampler, generates control instructions based on the determination, and transmits the control instructions to the computing system 130. In this example, the computing system 130 may be owned or operated by the service provider or another entity.

The boson sampler 150 is operable to prepare an input multimodal bosonic state, to perform a parametrised unitary transformation of the input multimodal bosonic state to an output multimodal bosonic state comprising a plurality of output modes, and to perform measurements on output modes of the output multimodal bosonic state to produce measurement outcomes, each measurement outcome based on the number of photons in measured output modes of the multimodal output bosonic state.

The boson sampler 150 comprises a state generation module 160, a reconfigurable linear bosonic circuit 170, and a state detection module 180. In the example shown in FIG. 1, the linear bosonic circuit 170 is a physical module comprised within the boson sampler 150. For example, the linear bosonic circuit 170 may comprise a linear interferometer of a photonic boson sampler. However, the skilled person will appreciate that this need not be the case—as discussed above, depending on the nature of the bosonic system used, the linear bosonic circuit 170 may instead be implemented as a sequence of control signals applied by a controller 140 to the input bosonic multimodal state.

The state generation module 150 is configured to generate an input multimodal bosonic state. The input multimodal bosonic state is a product state comprising a plurality of N bosons distributed across a plurality of M input modes. The number M of input modes is greater than or equal to the size L of candidate binary solutions to a binary optimization problem.

The reconfigurable linear bosonic circuit 170 is configured to receive the input multimodal bosonic state, to transform the input multimodal bosonic state to an output multimodal state, and to output the output multimodal bosonic state to the state detection module 180. The transformation is dependent on the values $\{\theta\}$ of a set of parameters $\theta$.

The state detection module 180 is configured to measure output modes of the output multimodal bosonic state to produce a measurement outcome based on the number of bosons in each measured output mode. In some examples, the state detection module 180 is configured to measure the number of bosons in each of at least L of the output modes using one or more boson number resolving detectors. For example, in a photonic boson sampler, the state detection module 180 may comprise one or more photon number resolving (PNR) detectors. In other examples, the state detection module 180 is configured to measure the parity of the number of bosons in each of at least L of the output modes. For example, the state generation module may comprise one or more homodyne detectors.

The controller 140 may be any suitable classical computing resource for performing classical processing tasks and for controlling the operation of the boson sampler 150. In an example, the controller 140 may comprise a single computing device such as a server. In another example, the controller 140 may comprise a collection or cluster of interconnected computing devices which are collectively configured to perform classical processing tasks and control the boson sampler 150. Classical processing tasks may be divided between the interconnected computing devices which may communicate with each other over a physical network, a peer-to-peer network, or a public communication network such as communication network 110.

The controller 140 is configured to receive a submitted binary optimization task. The binary optimization task may be received from a computing apparatus 120 over the communication network 110 or may be received directly from a user interacting with the controller 140. The controller 140 is further configured to coordinate the processing of a quantum-classical hybrid algorithm between the controller 140 as a classical resource and the boson sampler 150. The controller 140 is further configured to communicate to the submitting user a determined solution to the binary optimization problem.

The controller 140 is arranged to configure the boson sampler 150. In particular, during the processing of a quantum-classical hybrid algorithm, the controller 140 is configured to determine sets of parameter values $\{\theta\}$ to which the parameters $\theta$ of the linear bosonic circuit 170 are to be tuned. The controller 140 is able to configure the linear bosonic circuit 170 according to a set of parameter values $\{\theta\}$ and thereby to control the transformation of the input multimodal bosonic state that is implemented by the linear bosonic circuit 170. For example, the controller 140 may directly send control signals that tune the reflectivity/transmittance of a reconfigurable beam splitter or the phase imparted by a phase shifter.

The controller 140 is further able to cause the boson sampler 150 to operate a plurality $N_S$ of times such that the output distribution of the boson sampler 150 can be sampled. For example, the controller 140 may generate one or more control signals to cause the boson sampler to generate an input multimodal bosonic state. For example, with a photonic boson sampler in which the state generation module comprises a plurality of single photon sources, the controller may generate one or more control signals to control which single photon sources generate a single photon and when.

The controller 140 may optionally be able to control which input multimodal bosonic state is input into the boson sampler, for example by generating one or more control signals to control the number of bosons in each input mode. For example, in a photonic boson sampler in which the state generation module comprises a plurality of single photon sources, the controller may be able to generate one or more control signals to cause a selected number of photons to be emitted at a particular time point.

After a boson sampler is operated a number of times, measurement outcomes may be aggregated together to form a response. A response may be representative of an empirical probability distribution of the measurement outcomes. The controller 140 is further configured to receive a response from the boson sampler 150. The response may be received in any form. According to some examples, the response may comprise a list of $N_S$ measurement outcomes achieved from operating the boson sampler a plurality $N_S$ of times and taking corresponding measurements. According to other examples, the response may comprise a list of distinct measurement outcomes and their corresponding (empirically derived) probabilities.

The controller 140 is further configured to perform classical processing tasks including analysing the response from the boson sampler 150, mapping distinct measurement outcomes to binary sequences, mapping empirically derived probabilities to weightings of binary sequences, determining cost function values and/or objective function values and determining updates to parameter values.

Figure 2A:
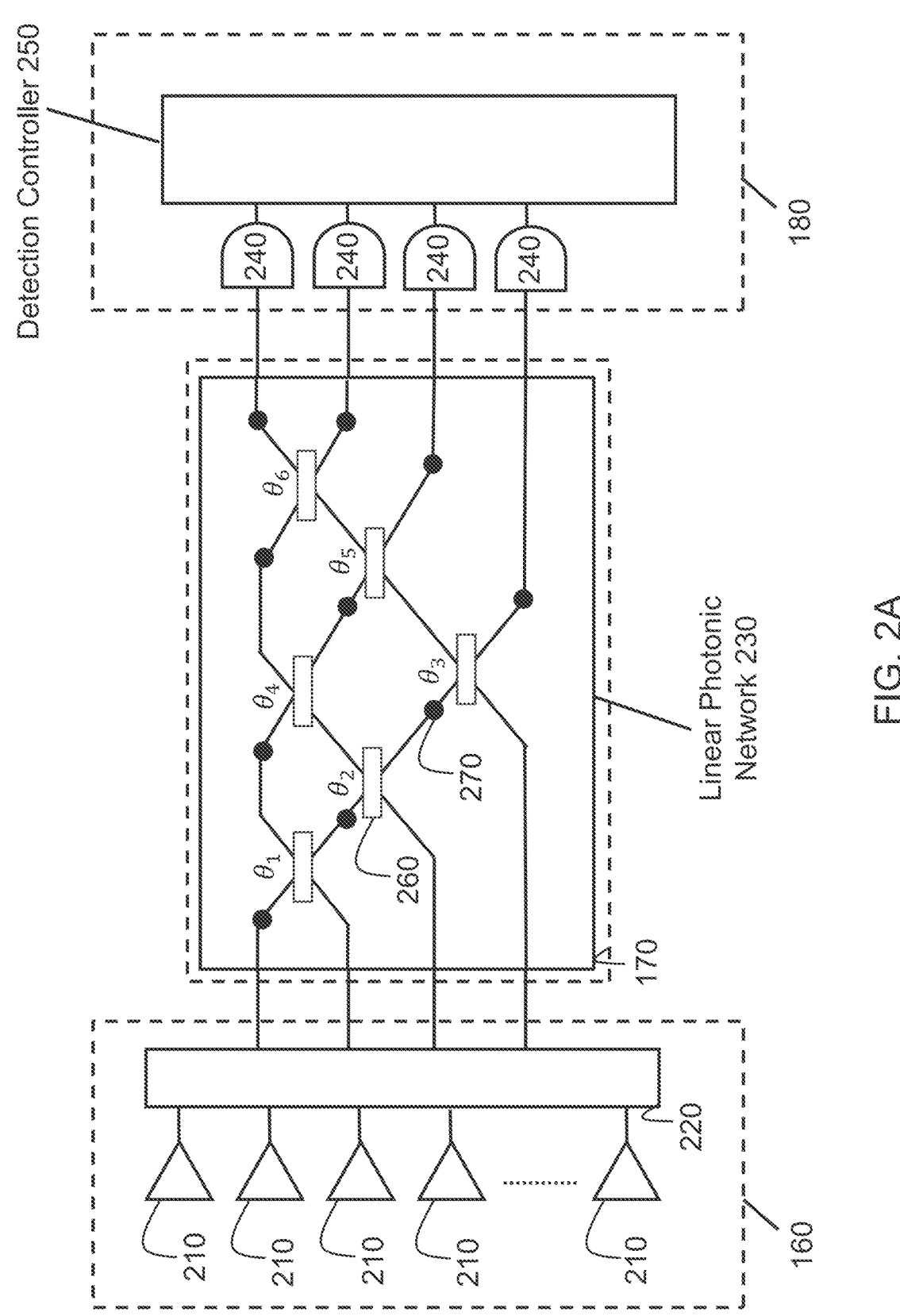
FIG. 2A shows an illustration of a first example of a boson sampler that may be utilised for performance of a quantum-classical hybrid algorithm as described herein.

FIG. 2A illustrates a first example of a boson sampler 150, in particular a photonic boson sampler, with which the quantum-classical hybrid algorithms described herein may be implemented. In the photonic boson sampler of FIG. 2A, the modes of the input multimodal bosonic state are spatial modes—that is, the state is defined by the number of bosons in each of a plurality of spatially separated paths.

The state generation module 160 of FIG. 2A comprises a plurality of single photon sources 210 configured to produce single photons. Single photon sources probabilistically generate a single photon and so the number of single photon sources may be greater than the number M of input modes of the input multimodal bosonic state $|\Psi_{IN}\rangle$. The state generation module 160 of FIG. 2A comprises a multiplexer 220 to route successfully generated single photons to N input ports of the M input ports of the linear bosonic circuit 170, which in FIG. 2A comprises a linear photonic network 230. The linear photonic network 230 may be provided on/in an integrated photonic circuit.

The linear bosonic circuit 170 of FIG. 2A is suitable for transforming an input multimodal bosonic state comprising M input spatial modes to an output multimodal bosonic state comprising M output spatial modes. This skilled person will appreciate that the other architectures for the linear bosonic circuit 230 may be utilised. Of course, while in the illustration the number of input and output modes is M=4, a linear bosonic circuit 170 may be provided to operate on a greater number of modes.

The linear photonic network 230 comprises a plurality of parametrised (reconfigurable) beam splitters 260 (indicated by rectangles in the figure and labelled with corresponding parameters). The linear photonic network 230 further comprises a plurality of parametrised (reconfigurable) phase shifters 270 (shown as dots in the figure—the phase shifts imparted by each phase shifter may also be reconfigurable but parameters are not shown in FIG. 2A). The linear photonic network 230 may further comprise mirrors and other passive photonic elements (not shown). Accordingly, the linear photonics network 230 routes the single photons received at the M input ports to the plurality of M output ports based on operations defined by a set of parameter values.

A parametrised/reconfigurable beam splitter is understood to mean any tuneable device or tuneable collection of devices capable of coupling two modes with each other with a reconfigurable reflection/transmission coefficient and optionally a reconfigurable phase shift coefficient. The parametrised beam splitters may be implemented in any suitable way—for example a parametrised beam splitter may comprise a Mach-Zehnder type interferometer containing a variable phase shifter in one internal path, and optionally an external phase shifter on one external path the Mach-Zehnder interferometer.

The state detection module 180 comprises a plurality of photon number resolving (PNR) detectors (240) each arranged to receive any photons output from a corresponding output port of the linear photonic network 230. A detection controller 250 receives signals from the plurality of detectors 240 and can accordingly determine a measurement outcome representative of the number of photons detected at each detector. The state detection module 180 comprises one PNR detector for each of the M output modes and accordingly the measurement outcomes are representative of the number of photons measured in all output modes of the output multimodal bosonic state. The skilled person would appreciate that for a binary optimization problem in which one seeks to find a binary sequence having a length L less than the number of modes M, the measurement outcomes of some of the PNR detectors may be discarded.

The specific linear photonic network 230 shown in FIG. 2A receives as input an input multimodal bosonic state having four input modes (M=4). The arrangement of six parametrised beam splitters 260 and ten phase shifters 270 of the linear photonic circuit 230 shown in FIG. 2A corresponds to the Reck decomposition (M. Reck et al., "Experimental realization of any discrete unitary operator", Phys. Rev. Lett., volume 73, page 58, 1994) of any unitary transformation of four modes. That is, the triangular arrangement of beam splitters (multimodal operations) and phase shifters (single mode operations) depicted in FIG. 2A can, with suitable beam splitter coefficients and phases, be used to implement any unitary transformation of an input state comprising four spatial modes to an output state comprising four spatial modes. The Reck decomposition is commonly used in universal multiport interferometers. As there are paths through the linear photonic network 230 such that every input mode interacts with every other input mode, the specific linear photonic network 230 of FIG. 2A can be described as a full-depth network and the boson sampler can be described as a "full-depth" boson sampler.

One example source of errors in photonic circuits is photon loss. Photon loss may increase exponentially with the depth of a photonic circuit—that is, the more optical elements that are used to implement the transformation U($\theta$), the more opportunity there is for photons to be lost from the boson sampler. Passive error mitigation techniques, typically based on classical postprocessing, only postpone the inevitable loss of the quantum character of an output distribution which makes the circuit efficiently simulatable classically. Thus, it may be desirable to keep a linear bosonic circuit "shallow" (i.e. not full-depth) in order to reduce the number of components implementing the linear bosonic circuit and thereby reducing the loss of photons.

Advantageously, the quantum-classical hybrid methods described herein can be utilised even with shallow bosonic circuits. In a photonic circuit, this means that a binary optimization problem can be addressed with fewer photonic elements (beam splitters, phase shifters, etc.) than would be used with a full-depth circuit, and therefore fewer photons are lost leading to reduced errors in computation.

Figure 2B:
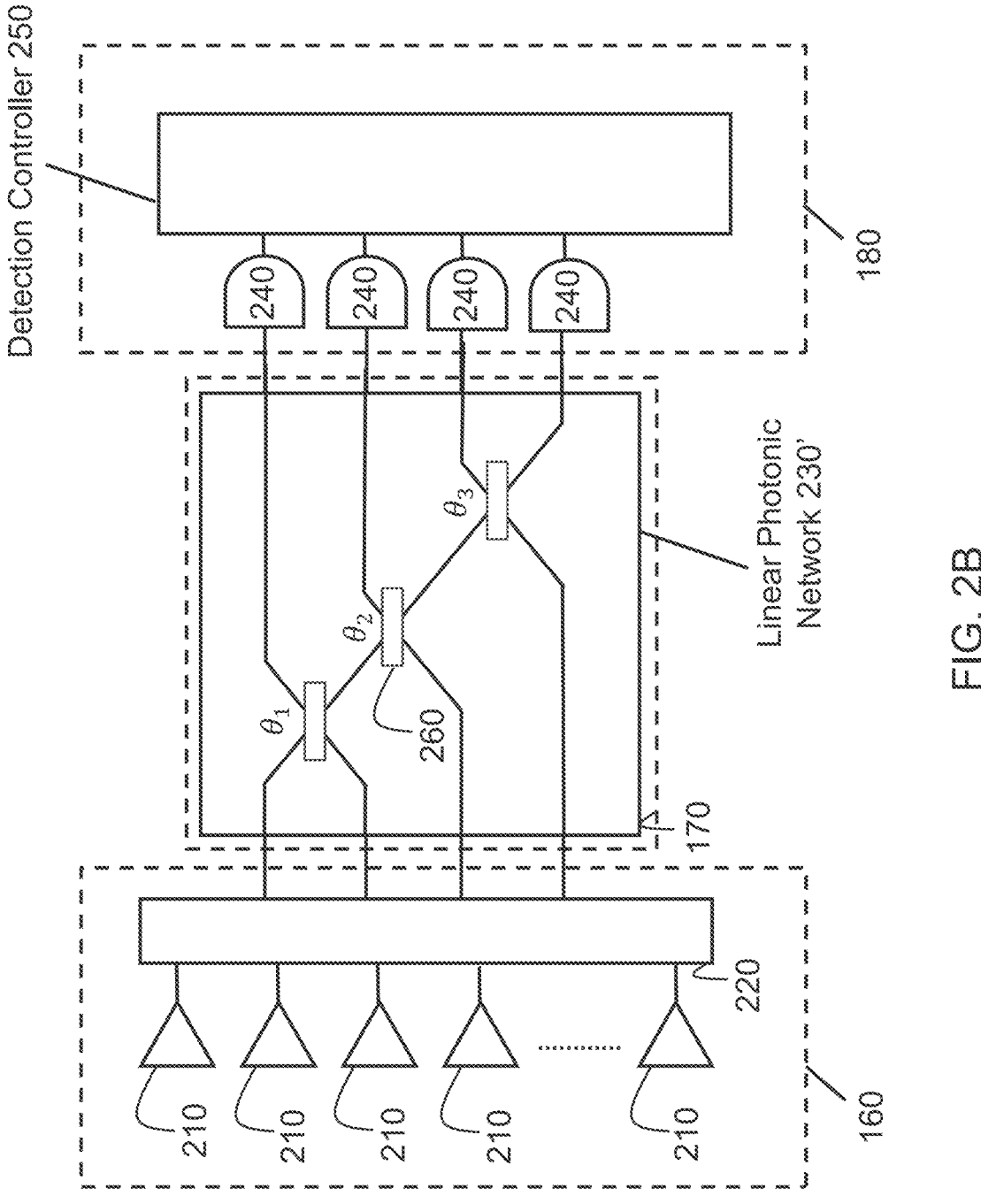
FIG. 2B shows a second example of a boson sampler that may be utilised for performance of a quantum-classical hybrid algorithm as described herein.

FIG. 2B illustrates a second example of a boson sampler 150, in particular a photonic boson sampler, with which the quantum-classical hybrid algorithms described herein may be implemented. The boson sampler is similar to that depicted in FIG. 2A except that the linear photonic network 230' of FIG. 2B has fewer optical components than the linear photonic network 230 of FIG. 2A. In particular, the linear photonic network 230' of FIG. 2B comprises three parametrised beam splitters. The arrangement of parametrised beam splitters in FIG. 2B is similar to the first diagonal "slice" of the triangular Reck decomposition shown in FIG. 2A and is an example of a shallow linear bosonic circuit that is capable of accessing all four digit binary sequences. Phase shifters are not shown in FIG. 2B as the effects of the phase shifters can be attributed to the reconfigurable beam splitters.

The skilled person will appreciate that the linear photonic networks 230 and 230' may comprise any arrangement of beam splitters, phase shifters, and other passive photonic elements, and that the illustrations shown in FIG. 2A and FIG. 2B are not in any way intended to be limiting.

Figure 2C:
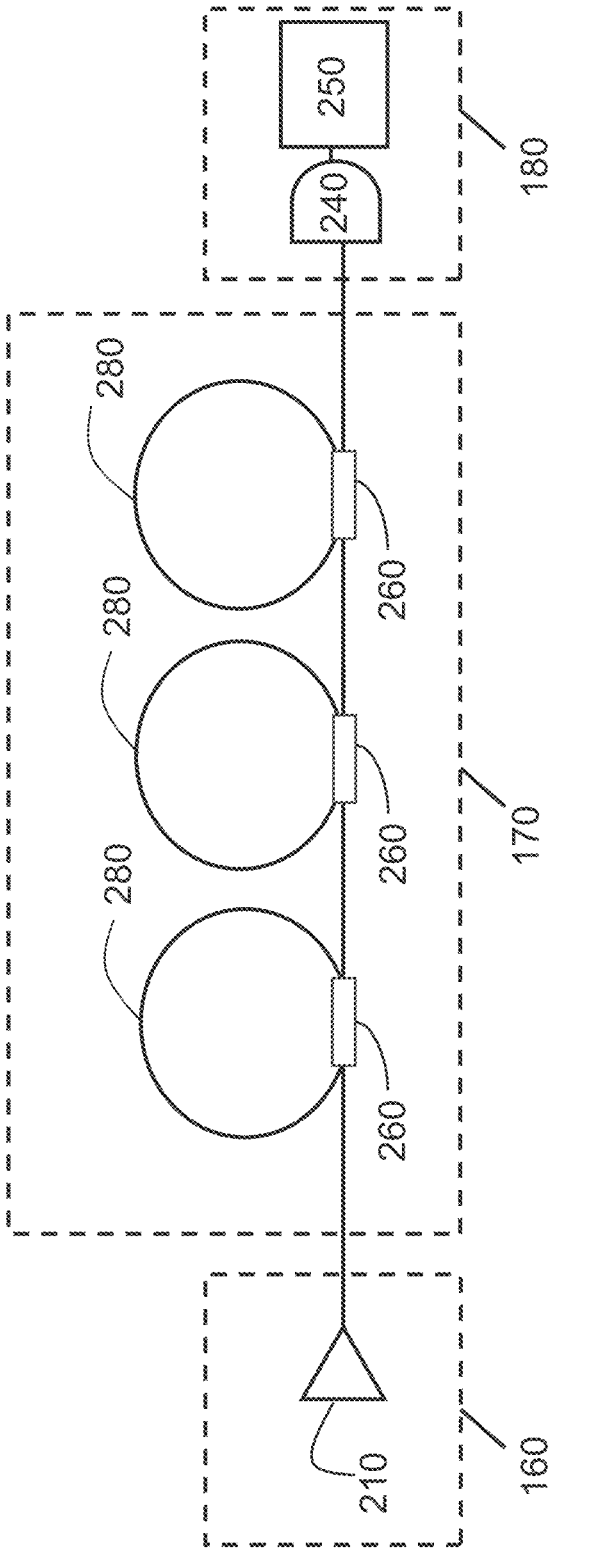
FIG. 2C shows a third example of a boson sampler that may be utilised for performance of a quantum-classical hybrid algorithm as described herein.

FIG. 2C illustrates a third example of a boson sampler 150, in particular a photonic boson sampler, with which the quantum-classical hybrid algorithms described herein may be implemented. In the photonic boson sampler of FIG. 2C, the modes of the input multimodal bosonic state are temporal modes. That is, the state is defined by the number of bosons in each of a plurality of temporal modes or time bins.

The state generation module 160 of FIG. 2C comprises a single photon source 210 configured to produce a single photon in each of a plurality of time bins, so that each photon enters the linear bosonic circuit 170, a time-bin interferometer, separated from the next by a time r. As in the boson sampler of FIG. 2A, the state generation module 160 may comprise further single photon sources 210 and a multiplexer 220 in order to reliably ensure that a single photon is generated in each time period r.

The linear bosonic circuit 170 comprises a plurality of parametrised beam splitters 260 and a corresponding plurality of loops 280 (for example optical fibre) of length $c_i$ where c is the speed of light in the fibre. In this way, photons in one temporal mode may be routed so as to interfere with photons in the next temporal mode on a parametrised beam splitter. Optical switches for selectively routing photons are not shown in the figure.

The parameter value (e.g., transmittance) of each parametrised beam splitter 260 can be selectively tuned by a controller 140 for each time interval. Accordingly, each loop 280 and beam splitter 260 combination can be used to implement a diagonal slice of the Reck decomposition. For example, for four input modes, the first loop 280 and beam splitter 260 can be used to implement the equivalent operations of the three beam splitters defined by parameters $\theta_1$, $\theta_2$ and $\theta_3$ shown in FIG. 2A. The second loop 280 and corresponding beam splitter 260 can be used to implement equivalent operations of the two beam splitters defined by parameters $\theta_4$ and $\theta_5$ shown in FIG. 2A. The third loop 280 and corresponding beam splitter 260 can be used to implement the equivalent operation of the beam splitter having parameter $\theta_6$ in FIG. 2A. That is, the time bin interferometer shown in FIG. 2C can be used to implement a full-depth circuit for four temporal modes. In general, with M−1 loops and corresponding beam splitters, a time bin interferometer can implement the full-depth Reck decomposition circuit for an M mode unitary operation.

The state detection module 180 comprises a photon number resolving detector 240 arranged to receive photons output from the linear bosonic circuit 170 in each temporal mode and a detection controller arranged to determine the measurement outcome.

Figure 2D:
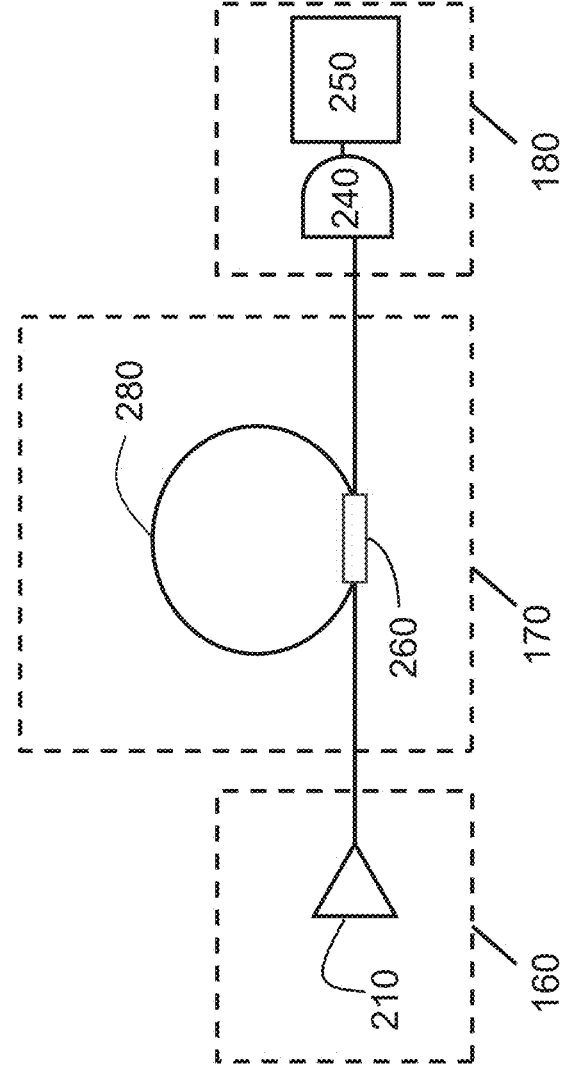
FIG. 2D shows a fourth example of a boson sampler that may be utilised for performance of a quantum-classical hybrid algorithm as described herein

FIG. 2D depicts a fourth example of a boson sampler, in particular a photonic boson sampler, with which the quantum-classical hybrid algorithms described herein may be implemented. The boson sampler depicted in FIG. 2D is similar to that shown in FIG. 2C except that the time-bin interferometer comprises a single loop 280 and corresponding beam splitter 260. As discussed above, with a single loop 280 and corresponding beam splitter 260 the equivalent operations of the three beam splitters defined by parameters $\theta 1$, $\theta_2$ and $\theta_3$ shown in FIG. 2A can be implemented. Indeed, the first slice of the Reck decomposition for an M mode transformation can be implemented.

The skilled person will appreciate that a boson sampler may comprise any suitable linear bosonic circuit. Generally speaking, the quantum-classical hybrid algorithms described herein may be implemented using an M-mode boson sampler capable of a set of M−1 multimodal operations. In such circumstances, a set of M−1 parameter values, in conjunction with a suitable parity mapping, can be used to access all binary sequences of length M.

Figure 3:
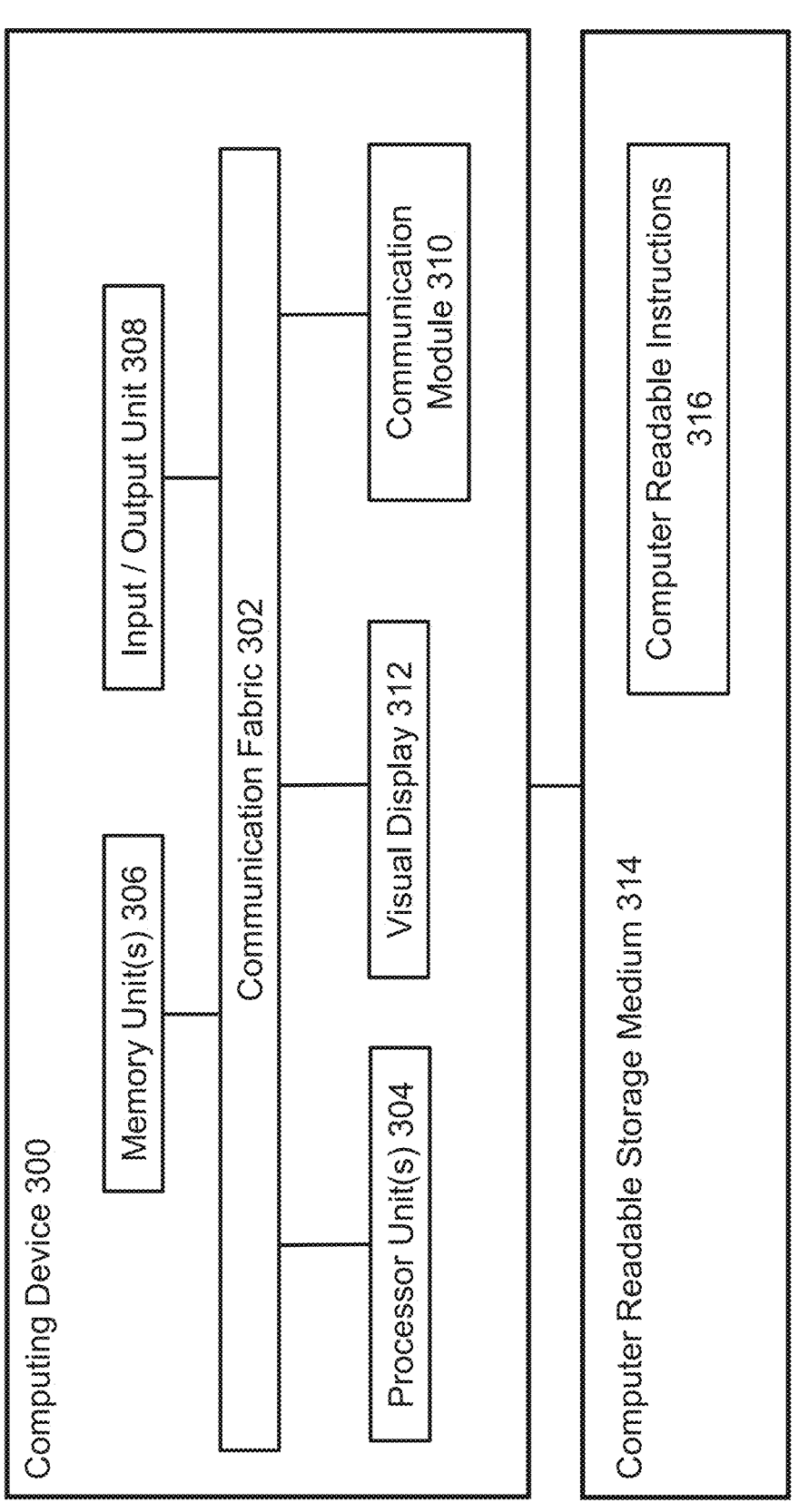
FIG. 3 shows a block diagram of a computing device and a computer-readable medium.

FIG. 3 depicts a block diagram of a data processing system/computing device 300 in which illustrative embodiments may be implemented. The computing device 300 may be implemented as, for example, a server or portable computer and so on. Computing device 300 may be distributed across multiple interconnected devices. Computing device 300 may be suitable for use as a controller 140 or computing apparatus 120. Other architectures to that shown in FIG. 3 may be used as will be appreciated by the skilled person.

Computing device 300 is an example of a computer, in which computer usable program code or instructions implementing the processes may be located. In this example, computing device 300 includes communications fabric 302, which provides communications between processor unit(s) 304, memory unit(s) 306, input/output unit 308, communications module 310, and display 312.

The one or more processing units/processors 304 are configured to execute instructions for software that may be loaded into the memory 306. Processor unit(s) 304 may be a set of one or more processors or may be a multi-processor core, depending on the particular implementation. Furthermore, processor unit(s) 304 may be implemented using one or more heterogeneous processor systems in which a main processor is present with secondary processors on a single chip.

The one or more memory unit(s) 306 may comprise any piece of hardware that is capable of storing information, such as, for example, data, program code in functional form, and/or other suitable information on a temporary basis and/or a permanent basis. The one or more memory units 306 may include, for example, a random access memory or any other suitable volatile or non-volatile storage device. The one or more memory units may include a form of persistent storage, for example a hard drive, a flash memory, a rewritable optical disk, a rewritable magnetic tape, or some combination thereof. The media used for persistent storage may also be removable. For example, the one or more memory units 306 may include a removable hard drive.

Input/Output unit 308 enables the input and output of data with other devices that may be in communication with the computing device 300. For example, input/output unit 308 may provide a connection for user input through a keyboard, a mouse, and/or other suitable devices. The input/output unit 308 may provide outputs to, for example, a printer. In embodiments in which a controller 140 of a heterogeneous computing system 130 comprises computing device 300, the input/output unit 308 may be configured to provide configuration instructions to a boson sampler 150 in order to configure the linear bosonic circuit of the boson sampler 150. The communication module 310 may be further configured to communicate with the boson sampler 150 to cause the boson sampler 150 to be operated and to receive responses from the boson sampler 150.

Communications module 310 enables communications with other data processing systems or devices. The communications module 310 may provide communications through the use of either or both physical and wireless communications links. In embodiments in which a controller 140 of a heterogeneous computing system 130 comprises computing device 300, the communications module 310 may be configured to send and receive communications over a communications network 110. In this way, the controller 140 may communicate with remote computing apparatuses 120.

Instructions for the applications and/or programs may be located in the one or more memory units 306, which are in communication with processor unit 304 through communications fabric 302. Computer-implementable instructions may be in a functional form on persistent storage in the memory unit(s) 306, and may be performed by processor unit 304.

These instructions may sometimes be referred to as program code, computer usable program code, or computer-readable program code that may be read and executed by a processor in processor unit 304. The program code in the different embodiments may be embodied on different physical or tangible computer-readable media.

In FIG. 3, computer-readable instructions are located in a functional form on computer-readable storage medium 314 that is selectively removable and may be loaded onto or transferred to computing device 300 for execution by processor unit(s) 304. A computer-readable storage medium may be, for example but not limited to, an electronic, magnetic, optical, electromagnetic, infrared, or semiconductor system, apparatus, device, or any suitable combination thereof. More specific examples of the computer-readable medium include the following: a portable computer diskette, a hard disk, a random access memory (RAM), a read-only memory (ROM), an erasable programmable read-only memory (EPROM or Flash memory), a portable compact disc read-only memory (CDROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Alternatively, computer-readable instructions 316 may be transferred to computing device 300 from computer-readable storage medium 314 through a communications link to communications module 310 and/or through a connection to input/output unit 308. The communications link and/or the connection may be physical or wireless.

In some illustrative embodiments, computer-implementable instructions 316 may be downloaded over a network to the memory unit(s) 306 from a remote device for use with computing device 300. For instance, computer-implementable instructions stored in a remote server may be downloaded over a network from the server to the device 300.

The skilled person would appreciate that the architecture described above in relation to FIG. 3 is not intended to provide limitations on the computing devices with which the methods described herein may be implemented. Instead, the skilled person would appreciate that other architectures may be applicable. For example, the computing device may include more or fewer components.

Figure 4:
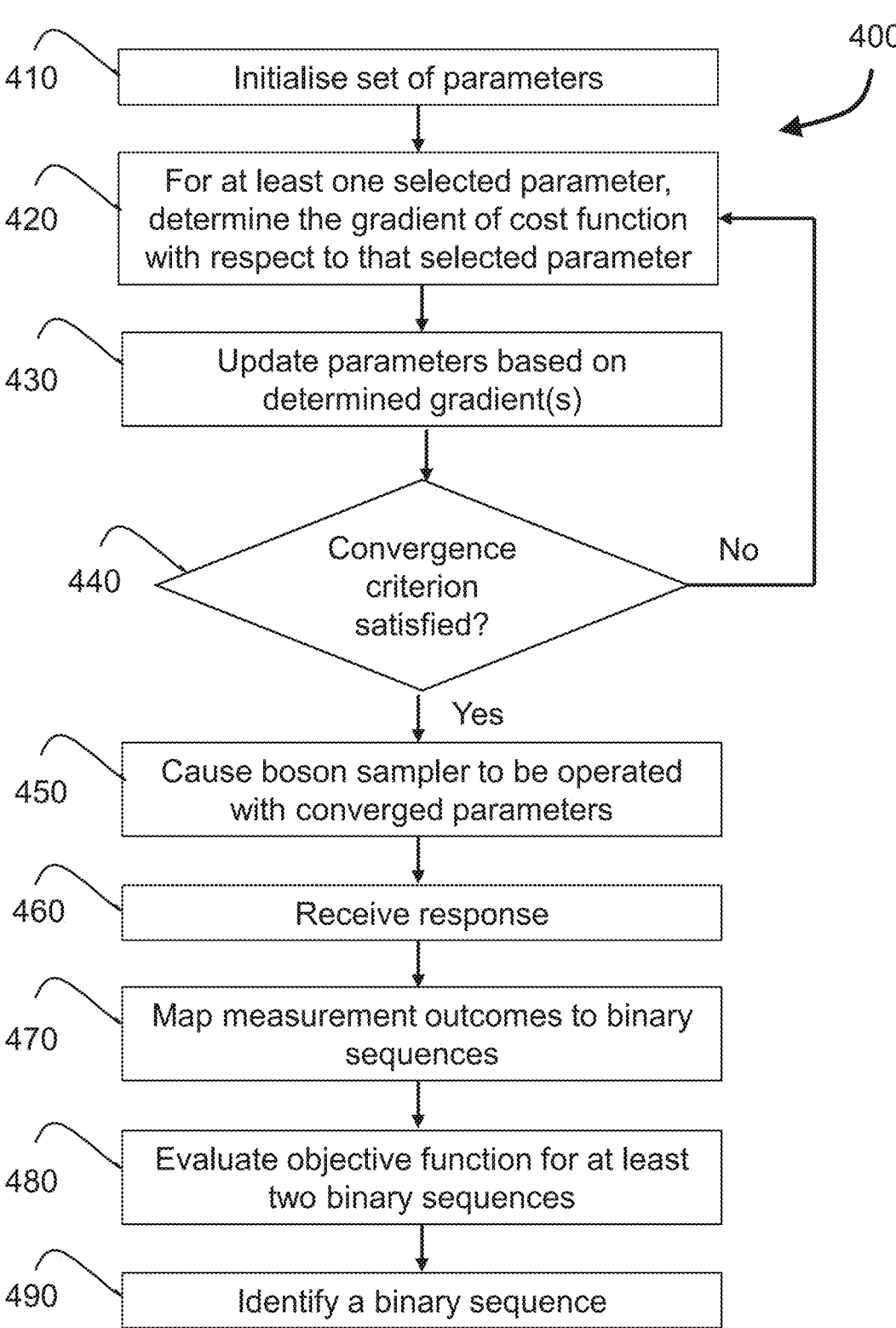
FIG. 4 shows a flow chart of a method for performance by a classical computing device in communication with a boson sampler.

FIG. 4 shows a flowchart of a method 400 for determining a solution to a binary optimization problem. In particular, the task is to identify a binary sequence b of length L to optimize an objective function F(b) that is characteristic of the binary optimization problem. The method 400 may be performed by a hybrid computing apparatus comprising a classical computing resource and a boson sampler, wherein the classical computing resource is able to, directly or indirectly, configure and communicate with the boson sampler. For illustrative purposes only, the method 400 will be described as though performed by the heterogeneous computing system 130 of FIG. 1, comprising a controller 140 and a boson sampler 150, although the skilled person will appreciate that the method 400 is more widely applicable. Furthermore, for illustrative purposes only, for the purposes of this example it is assumed that the state detection apparatus 180 of the boson sampler 150 comprises one or more boson number resolving detectors (such as photon number resolving detectors) and that a measurement of the output multimodal bosonic state yields a measurement outcome in the form of a string of integers; however, the skilled person will appreciate that other measurement types are also suitable.

The boson sampler 150 is configured to prepare an input multimodal bosonic state $|\Psi_{IN}\rangle$ comprising N single bosons arranged in M input modes. The choice of input multimodal bosonic state $|\Psi_{IN}\rangle$ will be discussed further below, but it is assumed that the number of single bosons N is either equal to the number of input modes M or is equal to one less than the number of input modes. That is, it is assumed that the input multimodal bosonic state is one of:

$$\Psi_{IN}\rangle_M = |1_1, 1_2, \ldots, 1_{M-1}, 1_M\rangle \tag{EQ. 8}$$

$$\Psi_{IN}\rangle_{M-1} = |1_1, 1_2, \ldots, 1_{M-1}, 0_M\rangle \tag{EQ. 9}$$

The boson sampler 150 is further configured to perform a parametrised unitary transformation of the input multimodal bosonic state $|\Psi_{IN}\rangle$ to an output multimodal bosonic state $|\Psi_{OUT}\rangle$ having M output modes.

In some examples, the controller 140 may be configured to control which input multimodal bosonic state is used. In other examples, the choice of input state may be defined by the hardware of the boson sampler, and may not be changed by the controller. As will be discussed further below, a controller 140 may be communicatively coupled with multiple boson samplers, one of which may be configured to operate with a first input state (EQ. 8) and another of which may be configured to operate with a second input state (EQ. 9).

At 410 the controller 140 selects/initialises a set of parameter values suitable for configuring the linear bosonic circuit 170 of the boson sampler 150. The controller 140 may optionally configure the linear bosonic circuit 170 in accordance with the initial set of parameters.

A cost function (EQ. 7) is to be reduced (e.g., minimised) using gradient descent. The skilled person will appreciate that other reduction (e.g., minimisation) methods may be utilised, for example stochastic gradient descent. In order to perform gradient descent, at each iteration one or more parameter values $\theta_k$ of the set of parameter values $\{\theta\}$ is transformed to $$\theta_k'$$

according to:

$$\theta_k' = \theta_k - \eta \frac{\partial E}{\partial \theta_k} \tag{EQ. 10}$$

where $\eta$ is a constant referred to as the learning rate. Updating the parameter values $\{\theta\}$ changes the empirical probability distribution that can be obtained by the boson sampler 150, which in turn affects the weights associated with each binary sequence. As can be seen in (EQ. 10) the update to a selected parameter depends on a partial derivative of the cost function with respect to that selected parameter. At 420, for at least one selected parameter, the controller uses the boson sampler 150 to determine a gradient of a cost function with respect to that selected parameter. The gradient of the cost function with respect to the selected parameter may be found using any suitable method.

According to a first example method for using the boson sampler 150 to determine the gradient of the cost function with respect to the selected parameter, the controller 140 may configure the boson sampler 150 to be operated with the current parameter values $\{\theta\}$, to receive from the boson sampler 150 a response representative of an empirical probability distribution of measurement outcomes, to map the measurement outcomes and the corresponding probabilities to a plurality of binary sequences and their corresponding weightings, and then to evaluate the cost function $E(\{\theta: \theta_k\})$. The controller 140 may next configure the boson sampler 150 such that the selected parameter $\theta_k$ is shifted by a small value $\epsilon$ while all other parameter values are maintained, receive a response from the boson sampler 150 representative of an empirical probability distribution of measurement outcomes, map the measurement outcomes and the corresponding probabilities to a plurality of binary sequences and their corresponding weightings, and then evaluate the cost function $E(\{\theta: \theta_k+\epsilon\})$. The argument $\{\theta: \theta_k+\epsilon\}$ has been used to denote that all current parameter values have been unchanged except for the selected parameter $\theta_k$. The numerical approximation for the gradient of the cost function with respect to the selected parameter can be used:

$$\frac{\partial E}{\partial \theta_k} \approx \frac{E(\{\theta: \theta_k + \epsilon\}) - E(\{\theta: \theta_k\})}{\epsilon} \tag{EQ. 11}$$

To determine the gradient according to (EQ. 11) would typically require great control over all of the parameters of the boson sampler 150 as the amount $\epsilon$ may be small for the approximation of (EQ. 11) to hold (e.g., $\epsilon/\theta_k<0.001$). Furthermore, one would typically use a large number of measurement outcomes to be able to distinguish between the two similar distributions.

Figure 5:
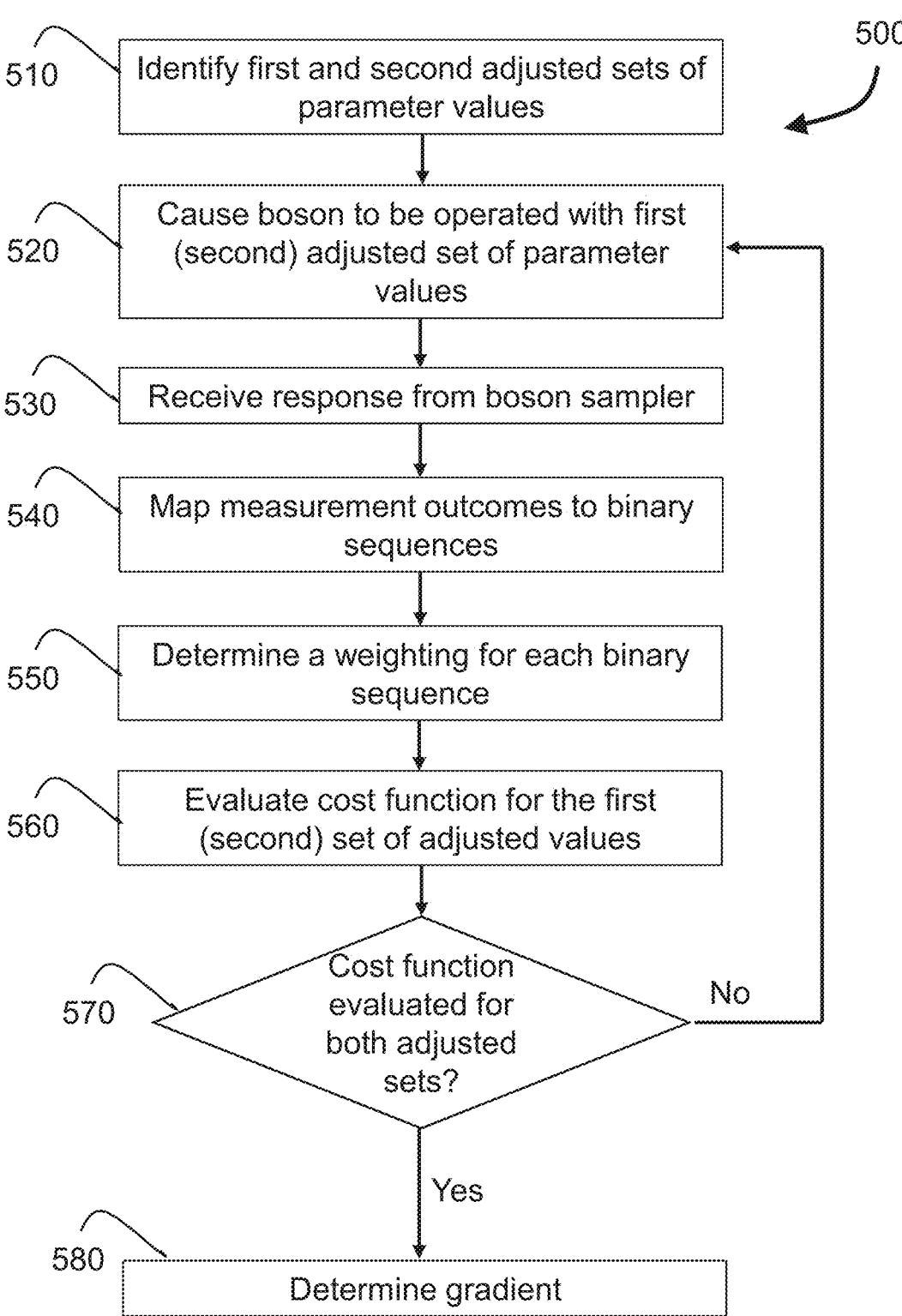
FIG. 5 shows a flow chart of a method for determining a gradient of a cost function with respect to a parameter.

A second example method for using the boson sampler 150 to determine the gradient of the cost function with respect to the selected parameter is described in relation to FIG. 5.

At 510, the controller 140 identifies first and second adjusted sets of parameter values. In the first adjusted set, all parameter values of the set of parameter values $\{\theta\}$ are maintained except for the selected parameter $\theta_k$, which is adjusted positively by an amount s. In the second adjusted set, all parameter values of the set of parameter values $\{\theta\}$ are maintained except for the selected parameter $\theta_k$, which is adjusted negatively by the same amount s.

At 520, the controller 140 causes the boson sampler 150 to be operated with the first adjusted set of parameter values. For example, the controller 140 may send one or more control signals to the boson sampler 150 to configure the parameters of the linear bosonic circuit 170. The controller 140 may send one or more initiation signals to start the boson sampler. At 530, the method comprises receiving a response from the boson sampler, the response representative of an empirical probability distribution of measurement outcomes.

At 540, the controller 140 maps each distinct measurement outcome, a string of integers, to a binary sequence of a plurality of binary sequences. Each element of a binary sequence corresponds to a measured output mode of the output multimodal bosonic state and has a value based on a parity of the number of bosons in that corresponding measured output mode. For example, under the parity mapping $\rho_0$ (EQ. 4), an element of the binary sequence has a value of 0 if the corresponding integer of the integer string is even, or has a value of 1 if the corresponding integer of the integer string is odd.

At 550, the controller 140 determines, from the empirical probability distribution of measurement outcomes, a weighting (EQ. 6) for each binary sequence to which a measurement outcome is mapped.

At 560, the method comprises evaluating the cost function (EQ. 7) for the first adjusted set using the plurality of binary sequences and the weightings of the binary sequences to obtain a first adjusted function value $E(\{\theta: \theta_k+s\})$.

Steps 520 to 560 are repeated for the second adjusted set to obtain a second adjusted function value $E(\{\theta: \theta_k-s\})$. The skilled person will appreciate that the order in which the first and second adjusted function values are obtained is not important.

Once it is determined (570) that both adjusted function values are obtained, the method proceeds to 580. At 580, the controller 140 determines, from the adjusted function values for the first and second adjusted sets, a gradient of the cost function $E(\{\theta\})$ with respect to the selected parameter $\theta_k$. In particular, the gradient is evaluated from:

$$\frac{\partial E(\{\theta\})}{\partial \theta_k} = \frac{E(\{\theta:\theta_k + s\}) - E(\{\theta:\theta_k - s\})}{2 \sin s} \qquad \text{(EQ. 12)}$$

Determining the gradient of the cost function $E(\{\theta\})$ with respect to the selected parameter $\theta_k$ in this way is beneficial as the amount s by which the selected parameter $\theta_k$ is adjusted need not be very small. Advantageously, this means that the empirical probability distributions from which the adjusted function values $E(\{\theta: \theta_k+s\})$ and $E(\{\theta: \theta_k-s\})$ are derived can be easier to distinguish. Furthermore, the amount s may be chosen based on the physical hardware used to implement the boson sampler. For example, in a photonic system it may be more feasible to shift the selected parameter by an amount $\pi/2$.

Returning again to FIG. 4, once the one or more gradients have been determined, at 430 the controller 140 updates the current set of parameter values $\{\theta\}$.

At 440 the controller 140 determines whether a convergence criterion has been satisfied. Any suitable convergence criterion may be utilised. As an example, determining that a convergence criterion has been satisfied may comprise determining that the set of parameters have been updated a threshold number of times i.e., that the parameter values have been updated for a threshold number of epochs/iterations. As another example, determining that a convergence criterion has been met may comprise determining that the cost function has not changed more than a threshold amount between different arrangements. As another example, determining that a convergence criterion has been met may comprise evaluating a function of the weightings of the binary sequences, such as an entropic measure of the weightings, and determining that the function is less than or greater than a predetermined threshold value.

If the convergence criterion has not been satisfied, then the method returns to step 420. If the convergence criterion has been satisfied, then the method proceeds to step 450.

At 450, the controller 140 causes the boson sampler 150 to be operated with the converged set of parameter values $\{\theta_{cov}\}$. At 460 a response is received from the boson sampler configured with those converged parameter values, the response representative of an empirical probability distribution of measurement outcomes.

At 470, the controller 140 maps each distinct measurement outcome, a string of integers, to a binary sequence of a plurality of binary sequences. Each element of a binary sequence corresponds to an integer of the integer string which in turn corresponds to a measured output mode of the output multimodal bosonic state, and each element has a value based on a parity of the integer to which that element corresponds. The parity mapping used is the same as that used in determining gradients of the cost function.

At 480, the controller 140 evaluates, for each of at least two binary sequences b to which a measurement outcome is mapped, the objective function F(b) using the binary sequence to determine a corresponding function value.

The gradient descent method performed does not guarantee that, after operating the boson sampler 150 with the converged parameters, the binary sequence with the greatest weighting is the globally optimal solution to the binary optimization problem. By iteratively tuning the parameters of the boson sampler 150, the bosonic distribution sampled by the state detection module 180 is iteratively updated, causing some binary sequences to be weighted more heavily that others. However, due to the probabilistic nature of quantum measurement, the fact that binary sequences have different multiplicities (i.e., different numbers of measurement outcomes that map to them) and the fact that the boson sampler is operated only a finite number $N_S$ of times to produce each distribution, mean that several binary sequences are likely to have weightings that are notably greater than the others. The iterative process reduces the number of candidate binary sequences of length L from $2^L$ to a number that is manageable on a classical computing resource. Accordingly, the controller 140 evaluates the objective function for at least two of the binary sequences to which a measurement outcome is mapped, but preferably evaluates the objective function for several binary sequences to which a measurement outcome is mapped. The choice of which binary sequence(s) to check may be based on any suitable criteria. For example, the controller 140 may evaluate the objective function for those binary sequences whose weighting is greater than a threshold value. In some examples, the controller 140 may evaluate the objective function for every binary sequence that corresponds to a measurement outcome received from the boson sampler operating with the converged parameters (all binary sequences of length L having a non-zero weighting) as for high dimensional problems (large L) this is still far fewer sequences to check than the original $2^L$ candidate solutions.

At 490, the controller 140 identifies, from the function values, a binary sequence. In particular, the controller 140 compares the function values to determine which of the checked binary sequences provides the smallest (or greatest) value. In this way, a solution to the binary optimization problem is found.

The skilled person will appreciate that the method described above in relation to FIG. 4 may be varied in several ways.

In the discussion above in relation to FIG. 4 and FIG. 5, no specific mention was made as to which parity mapping, $\rho_0$ or $\rho_1$ should be used. Furthermore, in the discussion above in relation to FIG. 4 and FIG. 5, no specific mention was made as to which input multimodal bosonic state $|\Psi_{IN}\rangle$ is used by the boson sampler. The skilled person will appreciate that either mapping may be used and either the input state of (EQ. 8) or (EQ. 9) may be used.

If the number of input modes/number of output modes is of even length (M even), then both mappings $\rho_0$ and $\rho_1$ map measurement outcomes to the same plurality of binary sequences (although, of course, for any particular measurement outcome, the mappings $\rho_0$ and $\rho_1$ map that outcome to complementary binary sequences). However, the multiplicities of each binary sequence under the two mappings are usually different. Accordingly, from a practical perspective, it may be beneficial to choose one mapping over the other, or to perform 410 to 480 once with each mapping.

However, if the number of input modes/number of output modes is of even length (M even), then the plurality of binary sequences to which the measurement outcomes are mapped depends on whether the number of bosons in the input multimodal bosonic state is even or odd. That is, if the boson sampler 150 is operated with an input multimodal bosonic state comprising M single bosons distributed among M input modes (EQ. 8) and all output modes are measured, then the measurement outcomes map to a first plurality of binary sequences of length M; if the boson sampler 150 is operated with an input multimodal bosonic state comprising M−1 single bosons distributed among M input modes (EQ. 9) and all output modes are measured, then the measurement outcomes map to a second plurality of binary sequences of length M different to the first plurality of binary sequences. Accordingly, in some examples and particularly those for which the length of a binary sequence is even and equal to the number of input modes, the controller 140 may be configured to perform steps 410 to 470 at least twice: at least once with an input multimodal bosonic state comprising M single bosons distributed among M output modes (EQ. 8), and at least once with an input multimodal bosonic state comprising M−1 single bosons distributed among the M input modes (EQ. 9). In this way, a globally optimal binary sequence of even length L=M may be identified (at 480).

If the number of input modes/number of output modes is of odd length (M odd) and all output modes are measured, then the two parity mappings $\rho_0$ and $\rho_1$ map measurement outcomes to complementary pluralities of binary sequences of length M. However, the pluralities of binary sequences to which the measurement outcomes are mapped does not depend on whether the number of bosons in the input multimodal bosonic state is even or odd. Accordingly, in some examples and particularly those for which the length of a binary sequence is odd and equal to the number of input modes, the controller 140 may be configured to perform steps 410 to 470 at least twice: at least once using the first parity mapping of measurement outcomes to binary sequences and at least once with the complementary mapping of measurement outcomes to binary sequences. In this way a globally optimal binary sequence of odd length L=M may be identified (at 480).

Accordingly, to find a globally optimal sequence b of length L=M to optimize a function F(b), one should perform the method 400 twice with appropriate choices of mapping and/or input multimodal state. However, it can be advantageous to perform the method 400 four times with the four possible combinations of mapping and input state in order to ensure that a globally optimal binary sequence is found. In some examples, the controller is configured to perform steps 410 to 470 at least four times: at least once using a first parity mapping and first choice of input state, at least once using the first parity mapping and second choice of input state, at least once using the complementary mapping and first choice of input state, and at least once using the complementary mapping and second choice of input state. In this way a globally optimal binary sequence of length M may be identified at 480 and any errors emerging due to e.g., the fact that only a finite number of measurements are taken, are mitigated.

Figure 6:
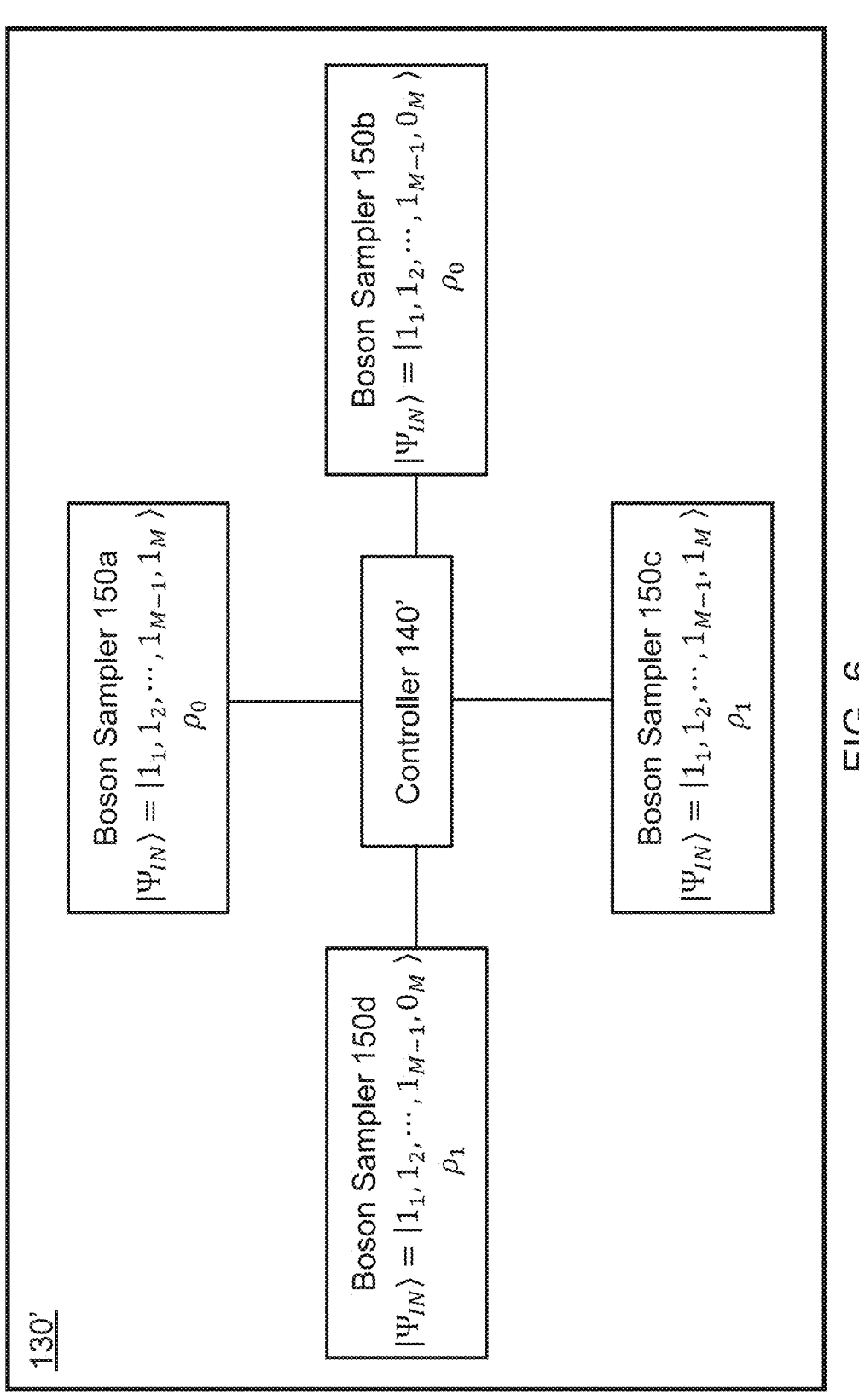
FIG. 6 shows block diagram of a binary optimization system.

FIG. 6 shows a block diagram of an alternative heterogeneous computing system 130'. The heterogeneous computing system 130' is suitable for identifying a globally optimal binary sequence of length M equal to the number of input modes/output modes of the bosonic states of the boson samplers. In FIG. 6, the binary optimization system 130' comprises a controller 140' and four boson samplers 150a, 150b, 150c, 150d. The first boson sampler 150a and third boson sampler 150c are configured to operate using an input multimodal bosonic state $|\Psi_{IN}\rangle_M$ (EQ. 8) and the second boson sampler 150b and fourth boson sampler 150d are configured to operate using an input multimodal bosonic state $|\Psi_{IN}\rangle_{M-1}$ (EQ. 9). The controller 140' is configured to perform the method 400 using the four boson samplers in parallel. When processing measurement outcomes from the first boson sampler 150a or second boson sampler 150b, the controller uses the mapping po such that if a measurement outcome indicates that an output mode was found to have an even number of bosons, the value of the corresponding character of the binary sequence is 0, while if the measurement outcome indicates that an output mode was found to have an odd number of bosons, the value of the corresponding character of the binary sequence is 1. When processing measurement outcomes from the third boson sampler 150c or fourth boson sampler 150d, the controller uses the mapping $\rho_1$ such that if a measurement outcome indicates that an output mode was found to have an even number of bosons, the value of the corresponding character of the binary sequence is 1, while if the measurement outcome indicates that an output mode was found to have an odd number of bosons, the value of the corresponding character of the binary sequence is 0. Advantageously, the heterogeneous computing system 130' is able to identify a binary sequence faster by operating the boson samplers 150a-150d in parallel.

Referring again to the method 400 of FIG. 4, if the candidate solutions to the binary optimization problem have a length L that is less than the number of input/output modes M, then the method 400 need only be performed once. In such circumstances measurements of all M output modes are unnecessary and instead the boson sampler 150 may be configured to perform measurements on L of the output modes and to not perform measurements on the remaining output modes. Alternatively, the boson sampler 150 may be configured to perform measurements on all M output modes, but in mapping the resulting measurement outcomes to binary sequences one or more integers/elements of the measurement outcome may be discarded. While an optimal binary sequence having length L<M may be found by performing the method 400 once, it is preferable to perform the method 400 with each of the two possible parity mappings.

Figure 7A:
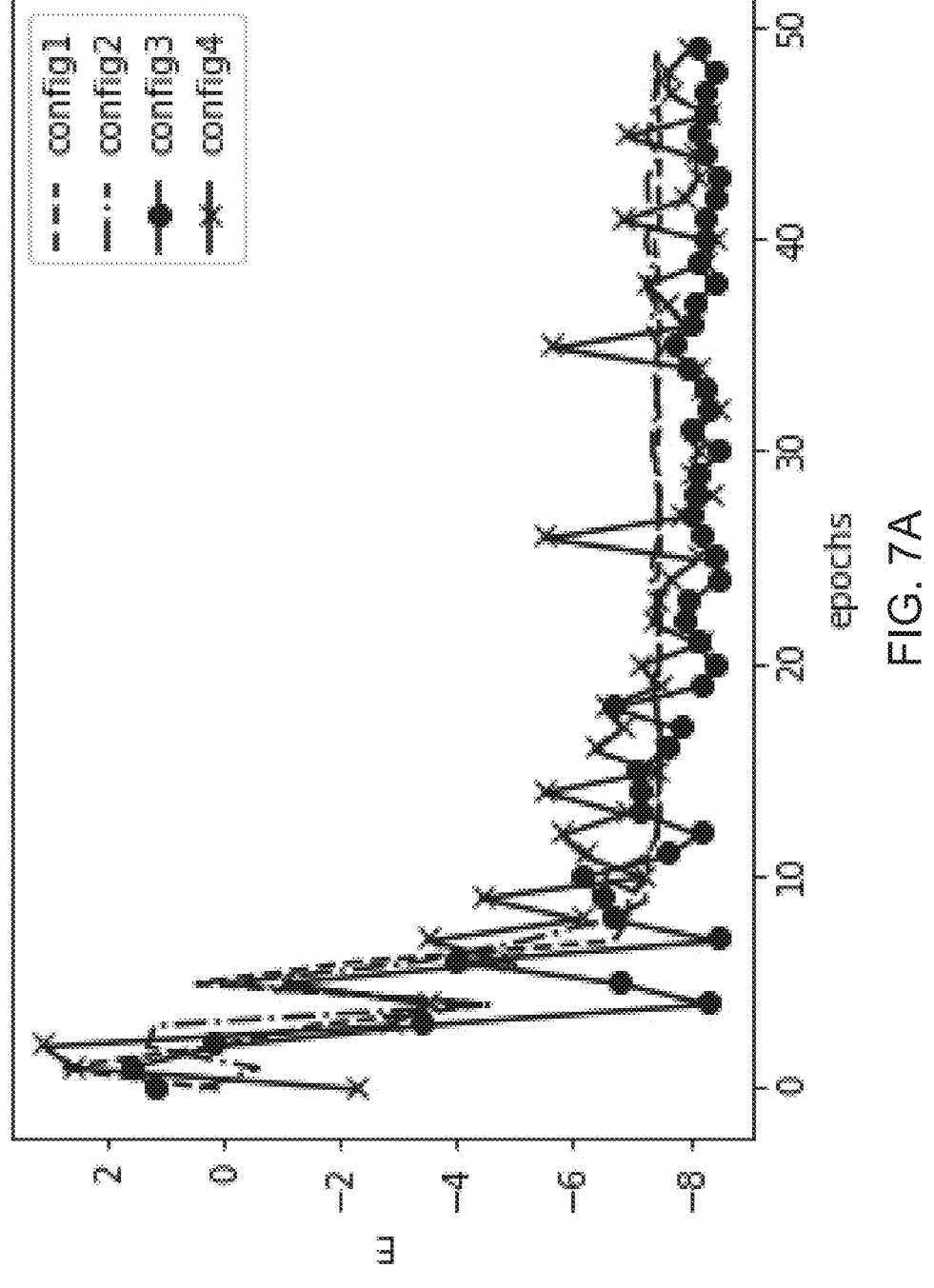
FIG. 7A shows a graph illustrating how a cost function changed over fifty epochs when solving one example problem.
Figure 7B:
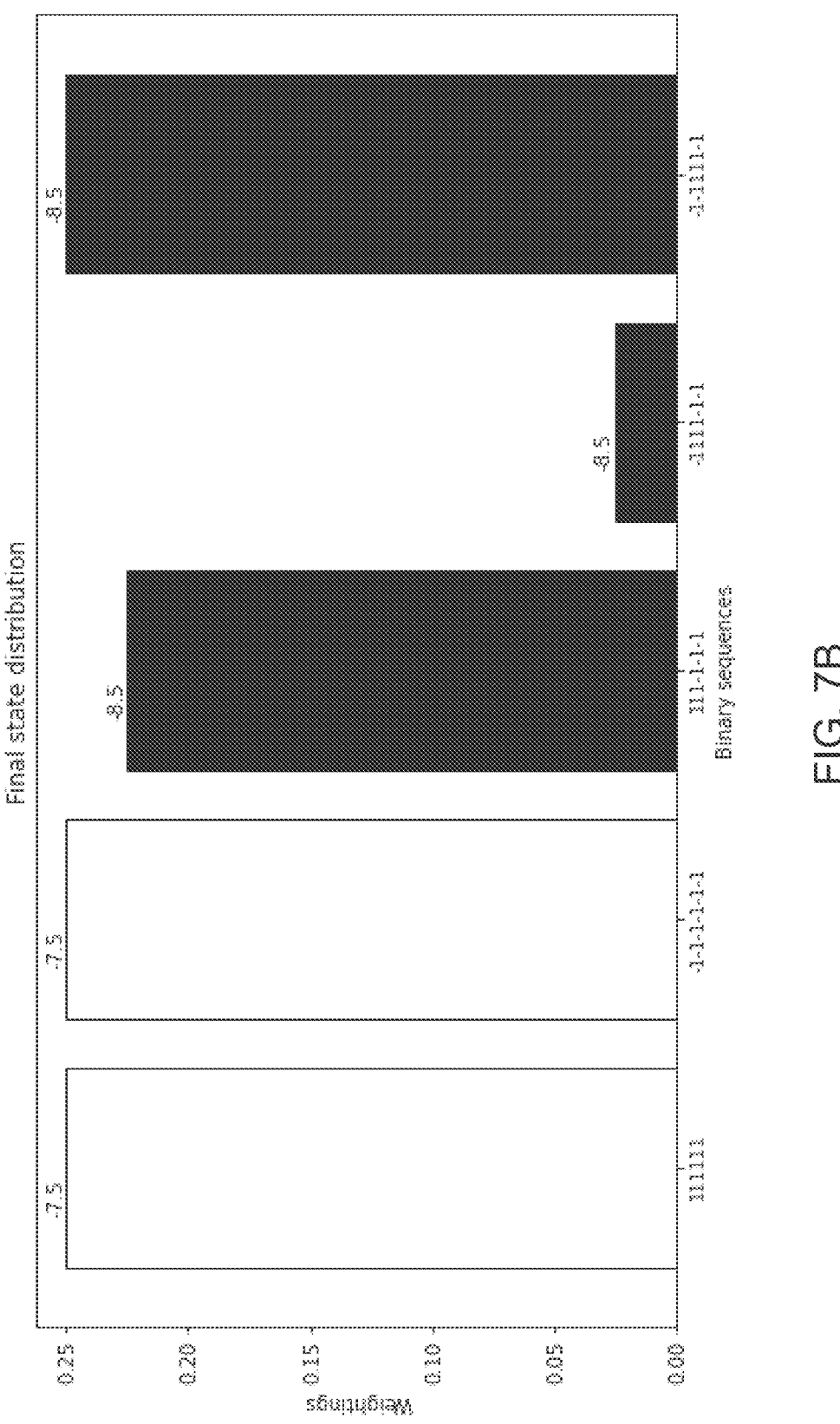
FIG. 7B shows a histogram of the weightings of the five binary sequences that had non-zero weightings after the fifty epochs when solving the example problem of FIG. 7A.

The methods described herein will now be demonstrated with reference to FIG. 7A and FIG. 7B.

QUBO is usually formulated as the problem of finding the binary sequence b that minimizes an objective function F(b) of the following form:

$$F(b) = b^T Q b \qquad \text{(EQ. 13)}$$

where b is a binary sequence (in vector form) of length L and Q is a real, symmetric matrix of dimension L×L. Finding an optimal solution to a QUBO problem is equivalent to minimizing a classical Ising Hamiltonian:

$$H = \sum_{1 \le i \le j \le L} J_{ij} s_i s_j + \sum_{k=1}^{L} h_k s_k + \text{constant} \qquad \text{(EQ. 14)}$$

where $s_k = 2b_k - 1$ is a binary variable taking a value of +1 or −1, and where the coefficients $J_{ij}$ and $h_k$ take real values. That is, finding a solution to a QUBO problem for which the binary variables take values 0 or 1 can always be rephrased as finding a binary sequence of spin values +1 or −1 that minimizes an Ising Hamiltonian. As an example, consider the family of Ising Hamiltonians on a Mobius graph, defined by:

$$H_{mob}(L, J_a, J_b) = -J_a \sum_{i=0}^{L-1} s_i s_{i+1} - J_b \sum_{i=0}^{\frac{L}{2}-1} s_i s_{i+\frac{L}{2}} \qquad \text{(EQ. 15)}$$

which has a periodic boundary condition of $s_L = s_0$. The coefficient $J_a$ is a positive real value, and the coefficient $J_b$ is a real value.

As an example, a quantum-classical hybrid algorithm as described herein was simulated to find a binary sequence of L=6 binary values to minimise the Ising Hamiltonian on a Mobius graph with coefficients $J_a$=2 and $J_b$=−1.5. More particularly, a shallow boson sampler such as that shown in FIG. 2D was simulated, with an input multimodal bosonic state comprising six temporal input modes (M=6) containing either 5 or 6 bosons (N=5, 6). The simulated linear bosonic circuit comprised a single loop 280 and parametrised beam splitter 260. In the simulation, the numbers of bosons in all 6 of the output modes were measured and accordingly each measurement outcome comprised a string of 6 integers. A set of 5 parameter values (corresponding to 5 transmittance values of the reconfigurable beam splitter 260 of FIG. 2D for implementing 5 multimodal operations between consecutive modes) was optimized to minimize a cost function $E(\{\theta\})$ (see EQ. 7) using gradient descent with a fixed learning rate of $\eta$=0.1 (see EQ. 10). Gradients at each iteration were computed using the method of FIG. 5. Every time the simulated boson sampler was operated, the number of measurement outcomes was taken to be $N_S$=80. The convergence criterion used was that the iteration has been performed 50 times (50 epochs).

As the solutions to the Hamiltonian problem comprise binary sequences having values of +1 or −1, the two classical mappings $\rho_0$ (EQ. 4) and $\rho_1$ (EQ. 5) were replaced accordingly with mappings $\rho_A$ and $\rho_B$ respectively:

$$\rho_A: b_k^{(A)} = 2 * \text{mod}\left[n_k^{(C)}, 2\right] - 1 \qquad \text{(EQ. 16)}$$

-continued $$\rho_B: b_k^{(B)} = 2\left(\text{mod}\left[n_k^{(C)}, 2\right] \oplus 1\right) - 1 \qquad \text{(EQ. 17)}$$

where $\rho_A$ maps an even number of bosons in an output mode to the value −1 and maps an odd number of bosons in an output mode to the value +1, and where $\rho_B$ maps an odd number of bosons in an output mode to the value −1 and maps an even number of bosons in an output mode to the value +1.

Gradient descent was performed for each of the four possible combinations of input state and classical mapping in turn. FIG. 7A shows how each combination converged over the course of the 50 epochs. On the x-axis in FIG. 7A the epoch is shown, and on the y-axis the cost $E(\{\theta\})$ is plotted. In the graph, "config1" represents the combination of input state having 6 bosons and classical mapping $\rho_A$. In the graph, "config2" represents the combination of input state having 6 bosons and classical mapping $\rho_B$. In the graph, "config3" represents the combination of input state having 5 bosons and classical mapping $\rho_A$. In the graph, "config4" represents the combination of input state having 5 bosons and classical mapping $\rho_B$. As can be seen in the graph, over the course of the 50 epochs, "config3" and "config4" converged to the same minimal value. As described above, when the number of modes of the boson sampler M is even, both parity mappings will map to the same plurality of binary sequences, but the number of bosons affects which binary sequences of length L=M are accessible.

For each of the four combinations, once the convergence criterion was satisfied (in this example, 50 epochs/iterations of the parameter values had been performed) the boson sampler was simulated with the corresponding converged parameter values to produce a further $N_S$=80 measurement outcomes, which were then mapped to binary sequences. The weightings of those binary sequences were also calculated from the empirical probability distribution of measurement outcomes for each of the combinations. Across all four combinations, after convergence the number of binary sequences derived from (converged) measurement outcomes had been reduced to just 5 possible sequences. FIG. 7B shows a histogram of the weightings (from all four combinations together) of these 5 sequences, and the associated objective function value for these 5 sequences is also shown. As can be seen from the figure, three spin sequences were identified that minimize the energy of the Hamiltonian $H_{mob}(6, 2, -1.5)$. These were (1, 1, 1, −1, −1, −1), (−1, 1, 1, 1, −1, −1), (−1, −1, 1, 1, 1, −1), which each give a value of −8.5.

Variations of the methods and systems described herein are envisaged, and a few such variations are mentioned below.

While in many of the examples described above, the measurement performed on the output multimodal bosonic state of the boson sampler has been described as a Fock state measurement (a measurement of the number of bosons in a mode), other measurement types may be applicable. For example, it is possible to measure the parity of the number of bosons in each mode. The parity operator acts on a single mode as:

$$\hat{\Pi}|n\rangle = (-1)^n |n\rangle \qquad \text{(EQ. 18)}$$

and may be implemented using, e.g., homodyne detection.

The methods and systems described herein may be used in conjunction with any suitable binary optimization problem. For example, a binary optimization problem may comprise a quadratic unconstrained binary optimization (QUBO) problem. A binary optimization problem may comprise, for example, a travelling salesman problem. A binary optimization problem may comprise a portfolio optimization problem.

Any suitable boson sampler may be utilised in conjunction with the methods and systems described herein.

In the examples described above, the learning rate was fixed. However, it can be beneficial to use an adaptive learning rate.

In the examples described above, the number of measurement outcomes was the same $N_S$ every time the boson sampler is used. However, the number may be varied for different uses of the sampler.

As will be appreciated by one skilled in the art, the present invention may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in any one or more computer-readable medium/media having computer usable program code embodied thereon.

Aspects and embodiments are described herein with reference to flowchart illustrations and/or block diagrams of methods, apparatus (systems) and computer program products according to illustrative examples. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Each feature disclosed in this specification (including any accompanying claims, abstract or drawings), may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A system comprising:
a boson sampler comprising:
    a set of one or more single photon sources, the set of one or more single photon sources configured to generate an input state comprising a plurality of input modes;
    a reconfigurable interferometer comprising one or more configurable parameters, the reconfigurable interferometer configured to generate an output state by performing a parametrized unitary transformation on the input state, wherein the parametrized unitary transformation is dependent on a set of one or more parameter values of the one or more configurable parameters; and
    an arrangement of one or more photon detectors, the arrangement of photon detectors configured to produce a measurement outcome indicative of a number of photons in output modes of the output state; and
a controller coupled to the boson sampler, the controller configured to:
    (i) determine the set of one or more parameter values that defines, at least in part, the parametrized unitary transformation performed by the boson sampler, wherein determining the set of one or more parameter values is based on a binary optimization problem;
    (ii) operate the boson sampler multiple times with the boson sampler tuned to the determined set of one or more parameter values;
    (iii) record one or more responses of the boson sampler for the multiple operations of the boson sampler, the one or more responses including measurement outcomes of the boson sampler;
    (iv) generate binary sequences based on the one or more responses, wherein to generate the binary sequences, the controller is further configured to map the measurement outcomes of the boson sampler to the binary sequences, wherein each element of one of the binary sequences corresponds to one of the output modes of the output state and each element has a value based on a parity of a number of photons in the one of the output modes;
    (v) calculate values of an objective function of the binary optimization problem for at least two of the binary sequences; and
    (vi) determine a solution to the binary optimization problem based at least in part on the calculated values.

2. The system of claim 1, wherein the input state and the output state of the boson sampler each comprise $M \geq 2$ modes, and wherein the set of one or more parameter values for defining the parametrized unitary transformation of the boson sampler comprises fewer than $M (M-1)/2$ parameter values.

3. The system of claim 1, wherein the input state of the boson sampler comprises a plurality of input spatial modes.

4. The system of claim 1, wherein the input state of the boson sampler comprises a plurality of input temporal modes.

5. The system of claim 1, wherein the input state comprises M≥2 input modes, each input mode comprising a photon, and the output state comprises M output modes;

wherein each binary sequence of the binary sequences has a number L>0 of elements that is fewer than M.

6. The system of claim 5, wherein the arrangement of one or more photodetectors of the boson sampler is configured to perform measurements on L of the M output modes of the output state.

7. The system of claim 1, wherein the input state comprises M≥2 input modes, each input mode comprising a photon;

wherein the system further comprises a second boson sampler that, when operated, is configured to generate a second input state comprising M input modes, with M−1 input modes comprising a photon; and wherein the controller is further configured to perform steps (i) to (vi) using the second boson sampler.

8. The system of claim 1, wherein the reconfigurable interferometer comprises one or more reconfigurable beam splitters each with a configurable reflection coefficient.

9. The system of claim 8, wherein each reconfigurable beam splitter comprises a Mach-Zehnder interferometer.

10. The system of claim 8, wherein the reconfigurable interferometer is comprised in an integrated photonic circuit.

11. The system of claim 1, wherein the input state and the output state of the boson sampler each comprise M≥2 modes, and wherein the reconfigurable interferometer comprises fewer than M configurable parameters.

12. A method comprising:

determining a set of one or more parameter values that defines, at least in part, a parametrized unitary transformation of a boson sampler, wherein determining the set of one or more parameter values is based on a cost function associated with a binary optimization problem, wherein the boson sampler comprises:

a set of one or more single photon sources, the set of one or more single photon sources configured to generate an input state comprising a plurality of input modes;

a reconfigurable interferometer comprising one or more configurable parameters, the reconfigurable interferometer configured to generate an output state by performing the parametrized unitary transformation on the input state, wherein the parametrized unitary transformation is dependent on the set of one or more parameter values of the one or more configurable parameters; and an arrangement of one or more photon detectors, the arrangement of photon detectors configured to produce a measurement outcome indicative of a number of photons in output modes of the output state;

generating instructions to operate the boson sampler multiple times with the boson sampler tuned to the determined set of one or more parameter values;

recording one or more responses of the boson sampler for the multiple operations of the boson sampler, the one or more responses indicating measurement outcomes of the boson sampler;

generating binary sequences based on the one or more responses, wherein generating the binary sequences comprises mapping the measurement outcomes of the boson sampler to the binary sequences, wherein each element of one of the binary sequences corresponds to one of the output modes of the output state and each element has a value based on a parity of a number of photons in the one of the output modes;

calculating values of an objective function of the binary optimization problem for at least two of the binary sequences; and determining a solution to the binary optimization problem based at least on the calculated values.

13. The method of claim 12, wherein one of the measurement outcomes indicates a measurement of a number of photons in one of the output modes of the output state.

14. The method of claim 12, wherein one of the measurement outcomes indicates a measurement of a parity of a number of photons in one of the output modes of the output state.

15. The method of claim 12, wherein determining the set of one or more parameter values comprises:

determining initial parameters values for the set of one or more parameter values;

generating instructions to operate the boson sampler tuned to different parameter values;

receiving measurement outcomes of output states of the boson sampler;

estimating a gradient of the cost function with respect to a parameter associated with the set of one or more parameter values, wherein the cost function is calculated based on the received measurement outcomes; and determining updated values for the set of one or more parameter values based on the estimated gradient of the cost function.

16. The method of claim 12, wherein the input state and the output state of the boson sampler each comprise M≥2 modes, and wherein the reconfigurable interferometer comprises fewer than M configurable parameters.

17. A non-transitory computer-readable storage medium comprising stored instructions that, when executed by a computing device, cause the computing device to perform operations including:

determining a set of one or more parameter values that defines, at least in part, a parametrized unitary transformation of a boson sampler, wherein determining the set of one or more parameter values is based on a cost function associated with a binary optimization problem, wherein the boson sampler comprises:

a set of one or more single photon sources, the set of one or more single photon sources configured to generate an input state comprising a plurality of input modes;

a reconfigurable interferometer comprising one or more configurable parameters, the reconfigurable interferometer configured to generate an output state by performing the parametrized unitary transformation on the input state, wherein the parametrized unitary transformation is dependent on the set of one or more parameter values of the one or more configurable parameters; and an arrangement of one or more photon detectors, the arrangement of photon detectors configured to produce a measurement outcome indicative of a number of photons in output modes of the output state;

generating instructions to operate the boson sampler multiple times with the boson sampler tuned to the determined set of one or more parameter values;

recording one or more responses of the boson sampler for
the multiple operations of the boson sampler, the one or
more responses indicating measurement outcomes of
the boson sampler;

generating binary sequences based on the one or more
responses, wherein generating the binary sequences
comprises mapping the measurement outcomes of the
boson sampler to the binary sequences, wherein each
element of one of the binary sequences corresponds to
one of the output modes of the output state and each
element has a value based on a parity of a number of
photons in the one of the output modes;

calculating values of an objective function of the binary
optimization problem for at least two of the binary
sequences; and determining a solution to the binary optimization problem
based at least on the calculated values.

18. The non-transitory computer-readable storage
medium of claim 17, wherein the input state and the output
state of the boson sampler each comprise M≥2 modes, and
wherein the reconfigurable interferometer comprises fewer
than M configurable parameters.

\* \* \* \* \*